US009922425B2

(12) United States Patent
Partis et al.

(10) Patent No.: US 9,922,425 B2
(45) Date of Patent: Mar. 20, 2018

(54) VIDEO SEGMENTATION METHOD

(71) Applicant: CANON KABUSHIKI KAISHA, Tokyo (JP)

(72) Inventors: Ashley John Partis, Liberty Grove (AU); Amit Kumar Gupta, Epping (AU); David Kenji See, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/955,518

(22) Filed: Dec. 1, 2015

(65) Prior Publication Data
US 2016/0155024 A1 Jun. 2, 2016

(30) Foreign Application Priority Data
Dec. 2, 2014 (AU) ................. 2014271236

(51) Int. Cl.
*G06K 9/34* (2006.01)
*G06T 7/11* (2017.01)
*G06K 9/00* (2006.01)
*G06K 9/62* (2006.01)
*G06T 7/143* (2017.01)
*G06T 7/90* (2017.01)
*G06T 7/194* (2017.01)

(52) U.S. Cl.
CPC ............ *G06T 7/11* (2017.01); *G06K 9/00684* (2013.01); *G06K 9/6277* (2013.01); *G06T 7/143* (2017.01); *G06T 7/194* (2017.01); *G06T 7/90* (2017.01); *G06T 2207/10016* (2013.01); *G06T 2207/10024* (2013.01); *G06T 2207/20032* (2013.01); *G06T 2207/20036* (2013.01); *G06T 2207/20081* (2013.01)

(58) Field of Classification Search
CPC .... G06K 9/6267; G06K 9/66; G06K 9/00684; G06T 7/0081; G06T 2207/20144; G06T 2207/10016; G06T 2207/20021; G07T 7/408
USPC ................................ 382/171, 173, 224, 227
See application file for complete search history.

(56) References Cited

U.S. PATENT DOCUMENTS 8,358,834 B2 *  1/2013  Cobb ................. G06K 9/00771
                                                    382/155
8,374,440 B2 *  2/2013  Vendrig ................... G06K 9/38
                                                    382/159

(Continued)

OTHER PUBLICATIONS

Reddy et al., "Improved Foreground Detection via Block-based Classifier Cascade with Probablistic Decision Integration", IEEE Transactions on Circuits and Systems for Video Technology, (2013), vol. 23, No. 1, pp. 83-93.

*Primary Examiner* — Kanjibhai Patel
(74) *Attorney, Agent, or Firm* — Canon USA, Inc., IP Division

(57) ABSTRACT

Disclosed is a method of classifying visual elements in a region of a video as either foreground or background. The method classifies each visual element in the region as either foreground or background using a first classifier, and expands spatially at least one of the visual elements classified as foreground to form a spatially expanded area. The method then classifies the visual elements in the spatially expanded area as either foreground or background using a second classifier that is more sensitive to foreground than the first classifier.

27 Claims, 16 Drawing Sheets

(56) References Cited

U.S. PATENT DOCUMENTS

| | | | |
|---|---|---|---|
| 8,526,723 B2* | 9/2013 | Prasad | G06K 9/34 |
| | | | 382/164 |
| 8,606,010 B2* | 12/2013 | Xiao | G06K 9/6257 |
| | | | 382/103 |
| 9,275,289 B2* | 3/2016 | Li | G06K 9/00825 |
| 2005/0276446 A1 | 12/2005 | Chen et al. | |
| 2008/0285859 A1 | 11/2008 | Lei et al. | |
| 2009/0003698 A1* | 1/2009 | Milward | G06K 9/38 |
| | | | 382/171 |
| 2012/0106837 A1* | 5/2012 | Partis | G06K 9/3241 |
| | | | 382/165 |
| 2013/0329987 A1 | 12/2013 | Gong | |

* cited by examiner

Pixels

Image

Empty pixels
represent grid points

Example superpixel
segmentation

VIDEO SEGMENTATION METHOD

REFERENCE TO RELATED PATENT APPLICATION(S)

This application claims the benefit under 35 U.S.C. § 119 of the filing date of Australian Patent Application No. 2014271236, filed 2 Dec. 2014, hereby incorporated by reference in its entirety as if fully set forth herein.

TECHNICAL FIELD

The present disclosure relates to object detection in a video and, in particular, to a method, apparatus and system for segmenting an image. The present disclosure also relates to a computer program product including a computer readable medium having recorded thereon a computer program for foreground segmentation of an image.

BACKGROUND

A video is a sequence of images. The images may also be referred to as frames. The terms 'frame' and 'image' are used interchangeably throughout this specification to describe a single image in an image sequence, or a single frame of a video. An image is made up of pixels where each pixel is represented by one or more values representing the visual properties at that pixel. For example, in one scenario three (3) values are used to represent the visual properties of a pixel: Red, Green and Blue colour intensity of each pixel.

The terms foreground objects and foreground refer to transient objects that appear in a scene captured on video. Such transient objects may include, for example, moving humans. The remaining part of the scene is considered to be background, even where the remaining part includes minor movement, such as water ripples or grass moving in the wind.

Scene modelling, also known as background modelling, involves modelling the visual content of a scene, based on an image sequence depicting the scene. One use of scene modelling is foreground segmentation by background subtraction. Foreground segmentation is also known as foreground/background separation. Foreground segmentation may also be described by its inverse (i.e., background segmentation). Examples of foreground segmentation applications include activity detection, unusual object or behaviour detection, and scene analysis.

Foreground segmentation allows a video analysis system to distinguish between transient foreground objects and the non-transient background through scene modelling of the non-transient background, and a differencing operation between that background and incoming frames of video. Foreground segmentation can be performed by using scene modelling and identifying portions of the modelled scene which are either moving, or recently changed/added, or both.

In one scene modelling method, the content of an image is divided into one or more visual elements, and a model of the appearance of each visual element is determined. Examples of possible visual elements include: a pixel, or an 8×8 DCT block. A scene model may maintain a number of models for each visual element location, with each of the maintained models representing different modes of appearance at each location within the scene model. The models maintained by a scene model are known as mode models, and mode models that correspond to background visual elements are known as a background modes. For example, there might be one mode model for a visual element in a scene with a light being on, and a second mode model for the same visual element at the same location in the scene with the light off.

One particular challenge to scene modelling is the "camouflage" problem. Camouflage is caused by areas of foreground that are similar in appearance to background. These areas of foreground are typically misclassified as background by scene modelling methods. When parts of a foreground object are not detected (such as due to the camouflage problem), higher level analysis (such as object tracking and activity detection) can fail. For example, a foreground object may be detected as two separate parts due to misclassifications, and a tracking module will track two separate objects, while a counting module will count two objects instead of one.

There are scene modelling techniques which use post-processing steps to reduce the camouflage problem. A typical post-processing step may be a median filter, or a morphological operation. These steps are reliant on most of the foreground being detected in an area. Large areas of foreground that have been misclassified as background cannot be solved by median filters and morphological operations. Other solutions may perform hole filling of connected components. However, hole filling can change areas of true background to foreground (for example, the gap between a person's legs).

Other scene modelling techniques have used Markov Random Field techniques, such as the graph cut algorithm, to improve robustness to misclassification of visual elements. However, such techniques are computationally expensive, particularly for substantially real-time surveillance applications, and are still unreliable for large areas of misclassified foreground.

Thus, a need exists to provide an improved approach for scene modelling, that is both robust to camouflage scenarios with large areas of misclassified foreground and that is also relatively computationally inexpensive.

SUMMARY

According to an aspect of the present disclosure there is provided a method of classifying visual elements in a region of a video as either foreground or background, the method comprising: classifying each visual element in the region as either foreground or background using a first classifier; expanding spatially at least one of the visual elements classified as foreground to form a spatially expanded area; and classifying the visual elements in the spatially expanded area as either foreground or background using a second classifier that is more sensitive to foreground than the first classifier.

Desirably the expanding spatially step uses a structuring element. The expanding spatially step can alternatively or additionally use visual similarity between visual elements. Preferably the expanding spatially step uses a structuring element and visually connected visual elements defined by the structuring element are added to the spatially expanded area.

A specific implementation further comprises a connected components step that forms one or more blobs of like classified visual elements, and the expanding spatially step uses a bounding box of the corresponding blob. Advantageously the expanding spatially step can use a structuring element and visually connected visual elements identified by applying the structuring element to the visual elements in a blob are added to the spatially expanded area if they are also within the bounding box of the blob. Alternatively the expanding spatially step may use a structuring element and visually connected visual elements identified by applying the structuring element to the visual elements in the blob are added to the spatially expanded area where those identified visual elements are also within a number of visual elements from the edge of the blob bounding box.

In other implementations the expanding spatially steps expands the visual elements asymmetrically. Preferably the spatial expansion is configured to spatially expand visual elements by less in a downward direction in comparison to other directions.

Desirably the second classifier is configured to be is less likely to match any given input visual element to a background model than the first classifier. A specific example further comprises establishing the first and second classifiers such that an N-dimensional volume of visual attribute values in an input visual element that the first classifier will match to the background model is larger than the N-dimensional volume of visual attribute values in an input visual element that the second classifier will match to the background model.

Advantageously wherein the first classifier and second classifier are configured to assume a Gaussian distribution. Preferably the second classifier is configured to assume a narrower luminance Gaussian distribution than the first classifier.

Other aspects are also disclosed.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1:
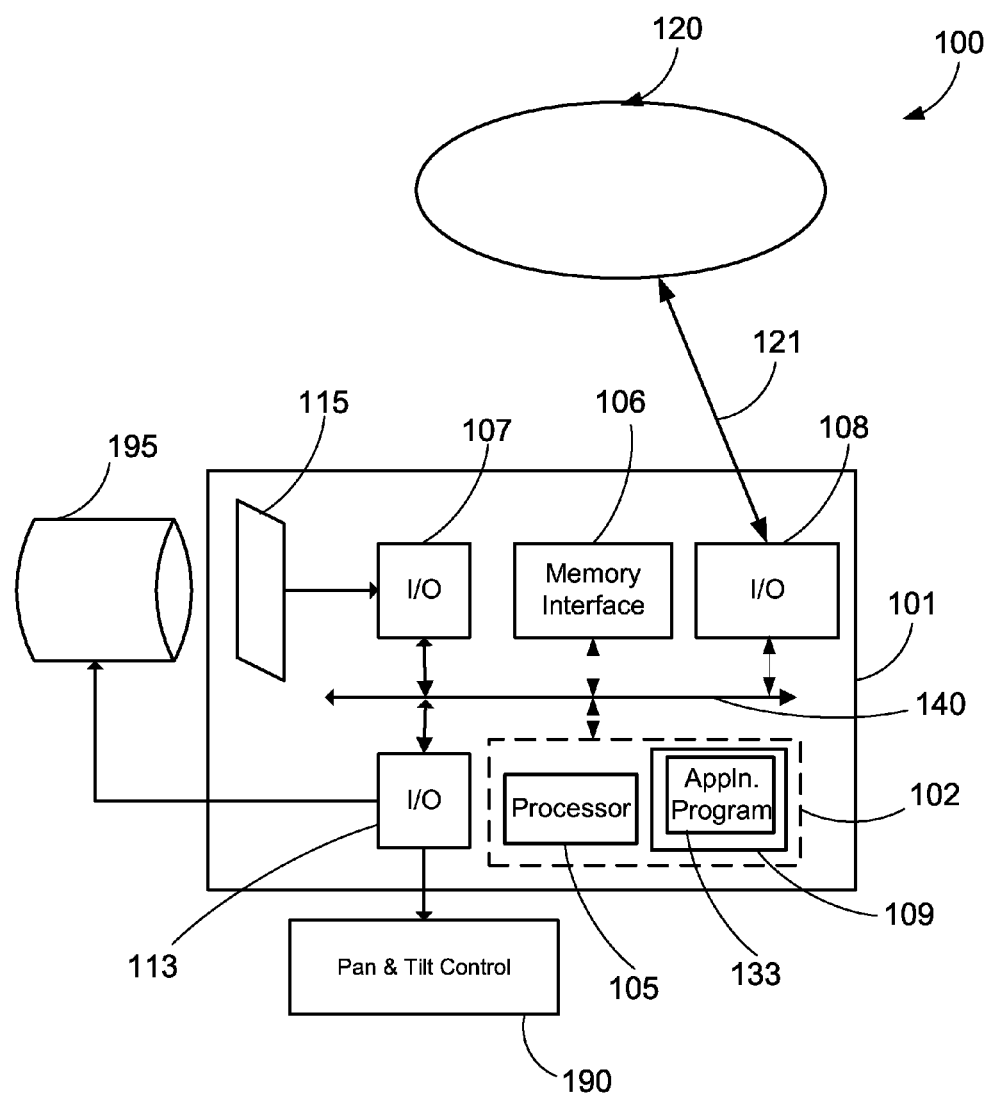
FIGS. 1 and 2 are a schematic block diagram of a camera, upon which methods described below can be practiced.

A video is a sequence of images or frames. Thus, each frame is an image in an image sequence (video sequence). Each frame of the video has an x axis and a y axis. A scene is the information contained in a frame and may include, for example, foreground objects, background objects, or a combination thereof. A scene model is stored information relating to a scene and may include foreground, background, or a combination thereof. A scene model generally relates to background information derived from an image sequence. A video may be encoded and compressed. Such encoding and compression may be performed intra frame, such as motion-JPEG (M JPEG), or inter-frame, such as specified in the H.264 standard. An image is made up of visual elements. The visual elements may be, for example, pixels, or 8×8 DCT (Discrete Cosine Transform) blocks as used in JPEG images in a motion-JPEG stream, or wavelet domain transformed images as used in JPEG2000 images in a motion-JPEG2000 stream. A visual element position in the frame axis is represented by x and y coordinates of the visual element under consideration.

One representation of a visual element is a pixel visual element. In one arrangement, each visual element has three (3) values describing the visual element. In one example, the three values are Red, Green and Blue colour values (RGB values). The values representing characteristics of the visual element are termed as visual element attributes. The number and type of values associated with each visual element (visual element attributes) depend on the format utilised for the computerized apparatus configured to implement the present disclosure. It is to be noted that values stored in other colour spaces, such as the four-valued Cyan, Magenta, Yellow, and Key black (CMYK), or values representing Hue-Saturation-Lightness, may equally be utilised, depending on the particular implementation, without departing from the spirit and scope of the present disclosure.

Another representation of a visual element is an 8×8 DCT block visual element. The visual element attributes for an 8×8 DCT block are 64 luminance DCT coefficients, 64 chrominance red (Cr) DCT coefficients, and 64 chrominance blue (Cb) DCT coefficients of the block. The 64 luminance DCT coefficients can be further divided into 1 DC coefficient, and 63 AC coefficients. The DC coefficient is a representation of average luminance value of the visual element and the AC coefficients represent the frequency domain information of the luminance characteristics of the 8×8 block. The AC coefficients are commonly ordered from lowest-frequency to highest frequency components, organised in a zig-zag fashion. AC1 represents the DCT component with the lowest horizontal frequency. AC2 represents the horizontal component with the lowest vertical frequency, and so on. The higher-numbered AC coefficients correspond to higher frequencies. The attributes are represented as (Y, U, V, AC), representing the DC coefficient (Y), the chrominance values (U, V) and the AC coefficients (AC), giving 196 attributes in total. Many other combinations of attributes are possible or other attributes can be generated from the above mentioned attributes using machine learning algorithms, such as linear regression techniques.

A region may be defined as one or more spatially connected visual elements, at which characteristics such as texture, average colour, or average brightness may be derived from the pixel image data of the corresponding image/video frame. A region may be the entire image, or a subset of the image. There is no requirements placed on the content of the region; a region could contain only background, or a region could contain only foreground, or a region could contain a mixture of background and foreground. A region may be user defined. For example, scene modelling may only occur in a region of the scene defined by the user.

Another representation of a visual element is a superpixel visual element. A superpixel can be defined as a set of pixels that generally have common properties, such as location and colour. Superpixels can be grown from seeds, where every pixel in the image is assigned to a seed based on a cost function. The cost function may include one or more attributes, such as: difference in intensity (e.g., colour and/or brightness) between the pixel and the seed, distance of the pixel from the seed, and minimum gradient cost from the seed to the pixel. The attributes for a superpixel may include average colour and/or brightness, size, orientation, standard deviation or variance of colour and/or brightness, or texture (e.g. such features as Local Binary Pattern (LBP)). In some applications, a superpixel may be considered a region with additional constraints, such as homogeneity of attributes and distance from the seed.

In an exemplary arrangement, a visual element is a superpixel. The colour model is typically YCbCr, where the Y component represents luminance, and the Cb and Cr represent chrominance. In other arrangements, a visual element is a pixel. In another arrangement, a visual element is an 8×8 DCT block.

It is to be noted that the described method may equally be practised using other representations of visual elements.

Figure 2:
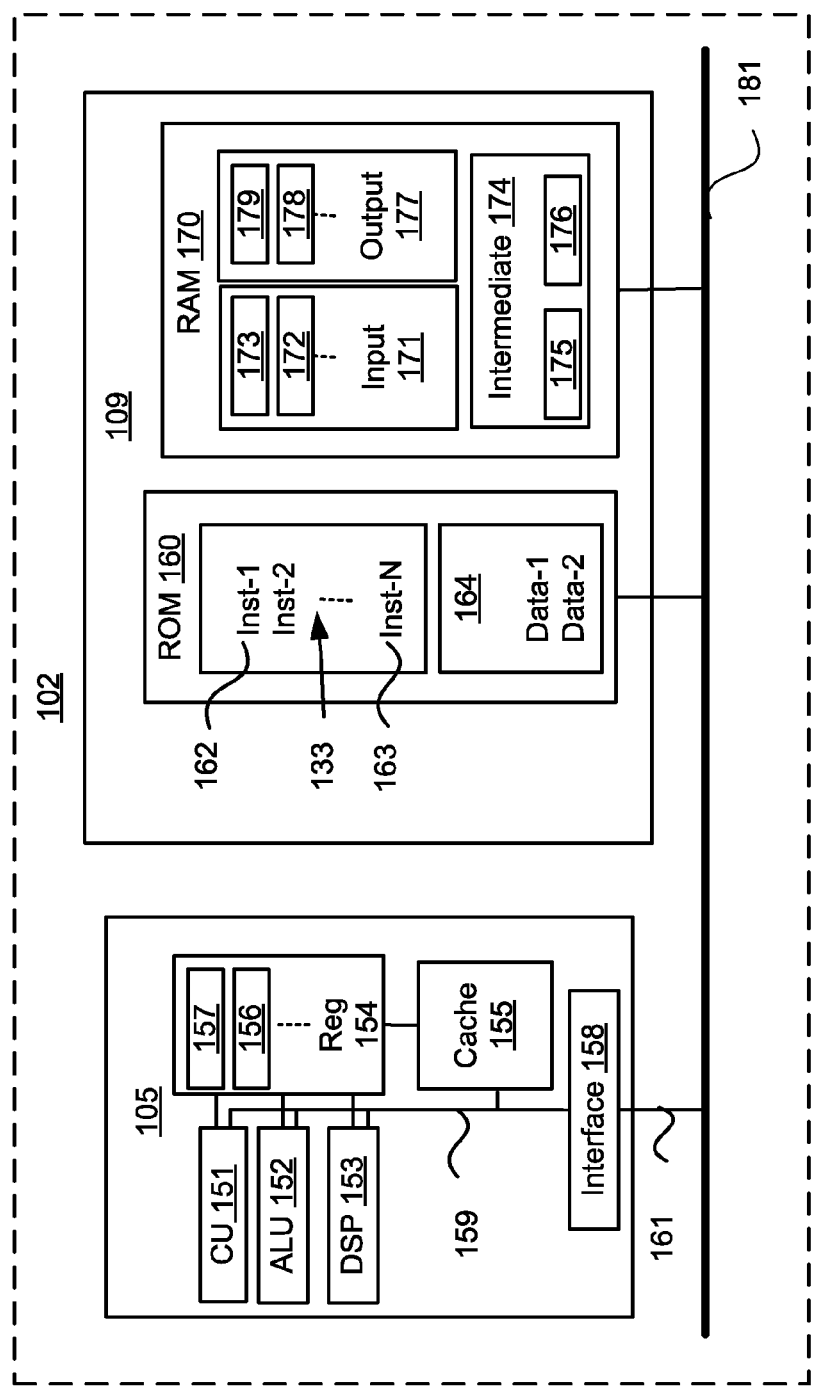

FIGS. 1 and 2 are a schematic block diagram of a camera 100, upon which described methods may be practiced. The camera 100 is a pan-tilt-zoom camera (PTZ), for example of a type often used for video surveillance operations, either as a stand-alone camera, or as part of a network of cameras configured to survey an area with or without overlapping fields of view. The camera 100 comprises a camera module 101, a pan and tilt module 190, and a lens system 195.

As seen in FIG. 1, the camera module 101 represents computerized apparatus and comprises an embedded controller 102. In the present example, the embedded controller 102 includes at least one processor unit 105 (or processor) which is bi-directionally coupled to an internal storage module 109. The storage module 109 may be formed from non-volatile semiconductor read only memory (ROM) 160 and semiconductor random access memory (RAM) 170, as seen in FIG. 2. The RAM 170 may be volatile, non-volatile or a combination of volatile and non-volatile memory.

As seen in FIG. 1, the camera module 101 also comprises a portable memory interface 106 which is coupled to the processor 105. The portable memory interface 106 allows a complementary portable memory device to be coupled to the camera module 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 101 also comprises an input/output (I/O) interface 107 that couples to a photo-sensitive sensor array 115.

The camera module 101 also comprises a communications I/O interface 108 that couples to a communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The camera module 101 also comprises an I/O interface 113 for the pan and tilt module 190 and the lens system 195.

The components, which include the sensor I/O interface 107, embedded controller 102, communications I/O interface 108, control interface 113 and memory interface 106 of the camera module 101, typically communicate via an interconnected bus 140 and in a manner which results in a conventional mode of operation known to those in the relevant art.

The described methods may be implemented using the embedded controller 102, where the processes of FIGS. 3 to 10 may be implemented as one or more software application programs 133 executable within the embedded controller 102. The camera module 101 of FIG. 1 implements the described methods. In particular, with reference to FIG. 2, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera module 101. However, in some instances, the application programs 133 may be supplied to the user encoded on one or more CD-ROM or other media (not shown) and read via the portable memory interface 106 of FIG. 1 prior to storage in the internal storage module 109 or in the portable memory as described above. In another alternative, the software application program 133 may be read by the processor 105 from the network 120, or loaded into the controller 102 or such portable storage medium from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 101. Examples of transitory or non-tangible computer readable transmission media that may also participate in the provision of software, application programs, instructions and/or data to the camera module 101 include radio or infra-red transmission channels as well as a network connection to another computer or networked device, and the Internet or Intranets including e-mail transmissions and information recorded on Websites and the like. A computer readable storage medium having such software or computer program recorded on it is a computer program product.

FIG. 2 illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera module 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processing (DSP) unit 153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera module 101. Typically, the application program 133 waits for events and subsequently executes the block of code associated with that event. Events may be triggered in response to input from the interfaces 107, 108 and 113 of the camera module 101.

The execution of a set of the instructions may require numeric variables to be read and modified. Such numeric variables are stored in the RAM 170. The described methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera module 101. The camera 100 may be used to capture input images representing the visual content of a scene appearing in the field of view of the camera 100. The visual content may include one or more foreground objects and one or more background objects.

Implementation

Figure 3:
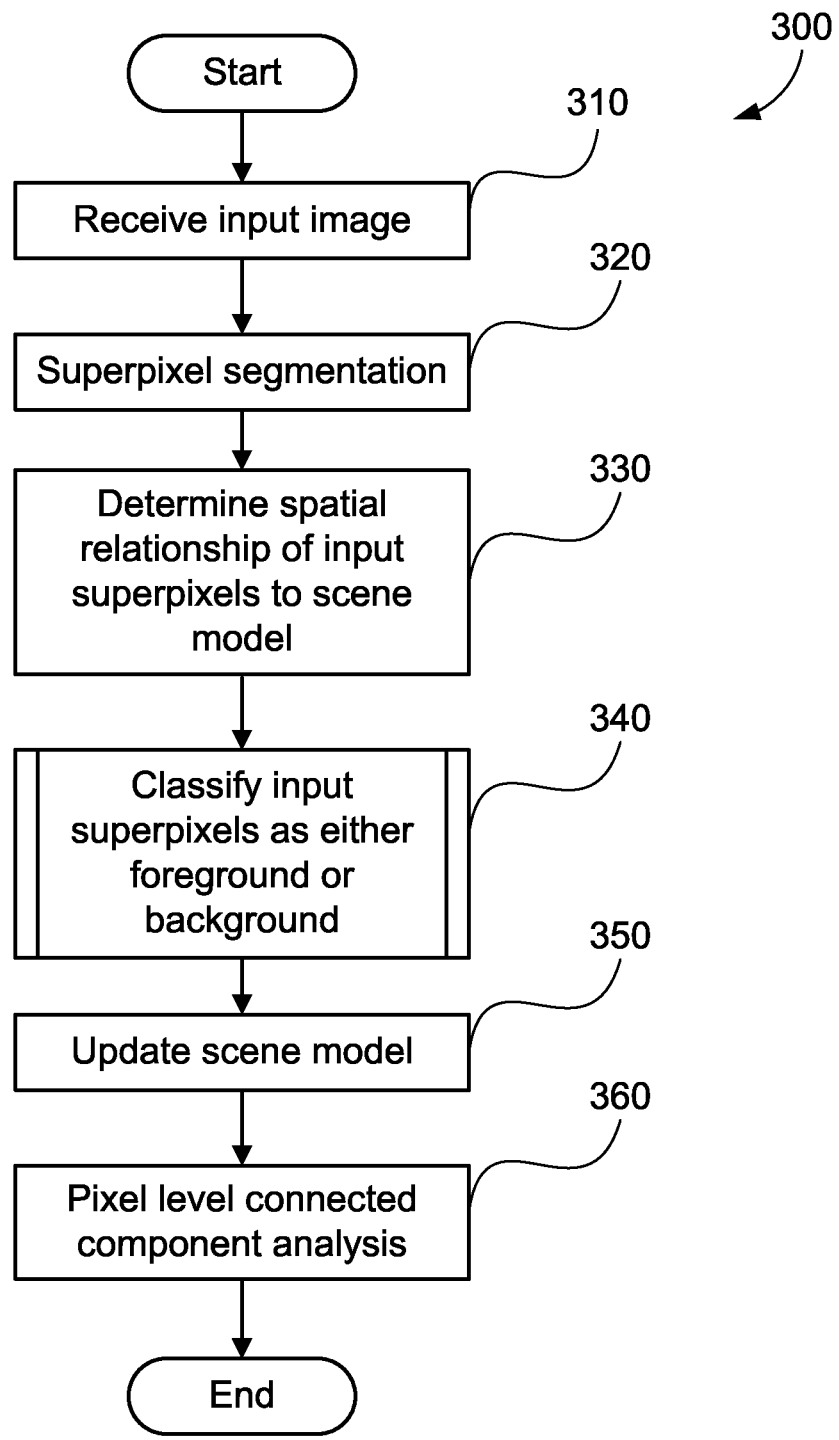
FIG. 3 is a schematic flow diagram illustrating a method of foreground segmentation.

FIG. 3 is a schematic flow diagram showing a method 300 of foreground segmentation. The method 300 may be implemented as one or more code modules of the software application program 133 resident in the storage module 109 of the camera 100 and controlled in its execution by the processor 105. The method 300 may be used for video segmentation to identify areas of foreground in a scene for a given image from a sequence of images.

The foreground segmentation method 300 uses superpixels as the visual element. Superpixels are dynamic visual elements for foreground segmentation. Superpixels are dynamic as the size and shape may change from frame to frame. That is, the size and shape of a superpixel is not pre-decided (as it is for the case of the visual element being a pixel or an 8×8 DCT block). The size and shape of a superpixel may change from frame to frame depending on the contents of the input image.

The method 300 begins at the receiving step 310 where an input image is received from sequence of images captured by the camera 100. The image may be retrieved at step 310 from the storage module 109. For example, the accessed image may have been captured by the camera 100 and stored within the RAM 170 of the storage module 109 prior to execution of the method 300.

At a segmenting step 320, the method 300 executed by the processor 105 segments the input image into a number of superpixels using a set of seeds. The superpixel segmentation of an image is a type of image over segmentation where salient features of a pixel-based representation, such as pixels sharing a similar colour and location, are preserved. In one arrangement, the seeds for the superpixel segmentation step 320 are given. In another arrangement, the seeds are calculated using the given image. In an exemplary arrangement, the seeds are selected according to a gridded pattern of the given image.

In one arrangement, the Simple Linear Iterative Clustering (SLIC) superpixel segmentation method is used. SLIC clusters pixels based on the colour similarity and spatial distance, usually in the LAB colour space. A typical feature vector for SLIC segmentation would be [l,a,b,x,y]. When clustering, each pixel is only compared to a seed within a search area, which is generally a 2S×2S area, where $S^2$ is the approximate area of a superpixel. S is also used to normalise the relative weights applied to the Euclidean distance of the colour similarity and the Euclidean distance of the spatial distance. After the first clustering, the seed feature vector is changed to the average feature vector for the cluster. The clustering process can then be repeated iteratively, followed by an averaging of the feature vector for each cluster to create the next set of seeds for the following iteration.

In another arrangement, the Geodesic superpixel segmentation method is used. Geodesic superpixel segmentation creates eight (8) gradient values for each pixel, based on the corresponding colour dis-similarity between a pixel and each of the 8-way neighbours. Pixels are then assigned to a seed by finding the seed with the minimum cost path to each pixel.

Other superpixel segmentation methods may alternatively be used.

During the segmenting step 320 executed by the processor 105, attributes are calculated for the segmented superpixels. In an exemplary arrangement, the attributes for a superpixel include the average colour. In an exemplary arrangement, the colour space YCbCr is used to represent the average colour of the superpixel. Other attributes may include the standard deviation or variance of the luminance of the superpixel, features to describe the shape of the superpixel (for example, an ellipse approximation), and features to describe the texture (for example, an LBP histogram).

Figure 4A:
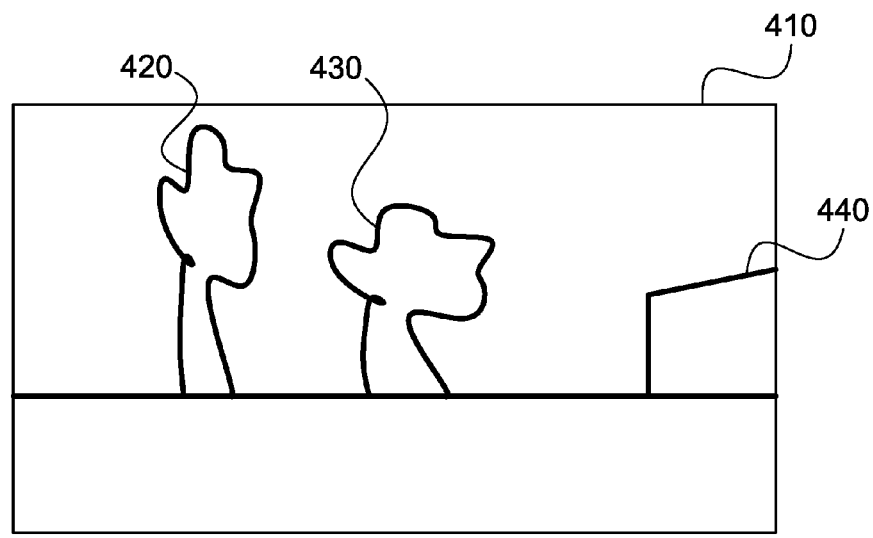
FIG. 4A shows an example of an input image.

FIG. 4A shows an example of an image 410 in a video sequence of a scene. The scene has three structures 420, 430, and 440. In the example of FIG. 4A the image 410 is received at step 310 and processed in accordance of the segmenting step 320.

Figure 4B:
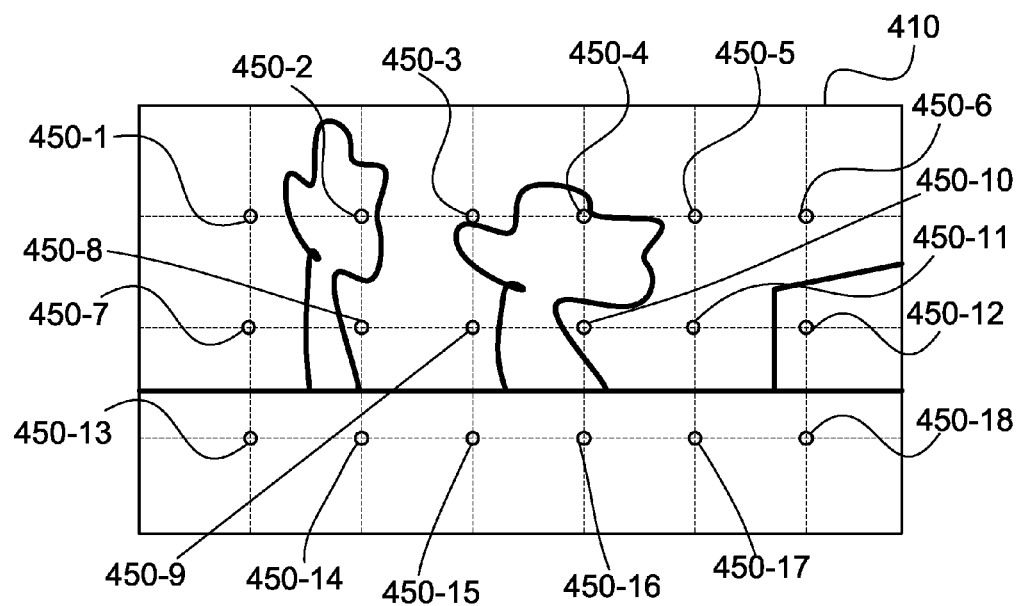
FIG. 4B shows the location of grids and grid based seed points in the image of FIG. 4A.

FIG. 4B shows grid points and grid based seed points to be used as seeds for the segmenting step 320 in the example image 410. In the example of FIG. 4B, there are a total of eighteen (18) seed points marked from 450-1 to 450-18 in raster scan (also known as row major) order. The seed points 450-1 to 450-18 are just the initial seed points to be used by the segmenting step 320. The segmenting step 320 may further perturb the seed points to move the seed points away from edges in the image, or relocate the seed points over multiple iterations during segmentation. Subsequent frames may either use the same input seed points from this frame, or use the relocated seed points from each corresponding previous frame.

Figure 4C:
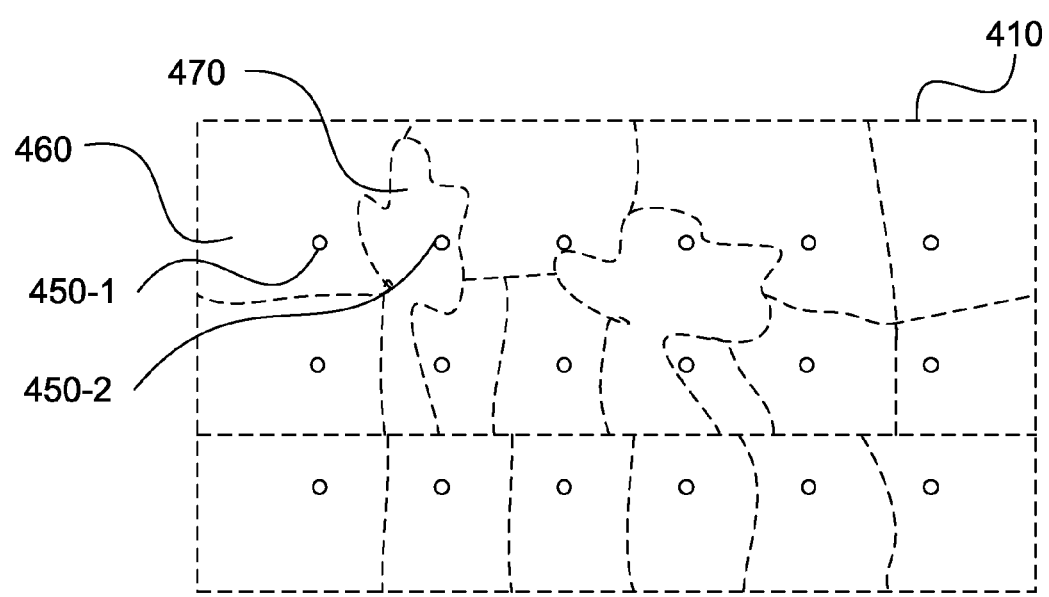
FIG. 4C shows superpixel segmentation of the input image of FIG. 4A.

FIG. 4C shows a possible superpixel segmentation of the example image 410. For example, segment 460 represents a superpixel visual element corresponding to seed 450-1, segment 470 represents a superpixel visual element corresponding to seed 450-2, and so on. In this example the superpixel visual element 470 is seen to correspond with the structure 420 of FIG. 4A.

Returning to method 300, at determining step 330, the spatial relationship of each superpixel visual element 460, 470 to the scene model 610, is determined by the processor 105. In an exemplary arrangement, the scene model 610 contains an element model set 620 (seen in FIG. 6) for each grid point (superpixel seed) 450-1 to 450-18. Each element model set 620-1, 620-2, and so on, has a direct relationship to a grid point 450-1, 450-2, and so on. Thus, a first superpixel visual element 460 corresponding to a first grid point 450-1 will always be associated to a first element model set 620-1, and a second superpixel visual element 470 corresponding to a second grid point 450-2 will always be associated to a second element model set 620-2, and so on.

In another arrangement, determining step 330 may alternatively associate an input superpixel visual element with an element model set 620-1 based on the spatial locality of the superpixel visual element 460 to the element model set 620-1. In one example, the spatial locality of the superpixel visual element 460 may be the centroid of the superpixel visual element. In another example, the spatial locality of the superpixel visual element 460 may be the centre of a bounding box of the superpixel visual element. Each superpixel visual element 460, 470 will be associated with the closest element model set (for example, 620-1). In this arrangement, the number of element model sets 620-1 to 620-5 does not need to be the same as the number of seeds 450-1 through 450-18.

FIGS. 5A, 5B, 5C, and 5D give an example of grid based seed points.

Figure 5A:
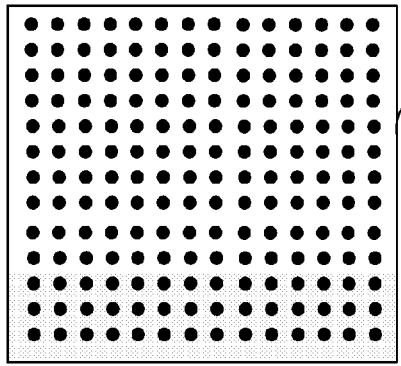
FIG. 5A shows an image with pixels marked as filled circles.
Figure 5B:
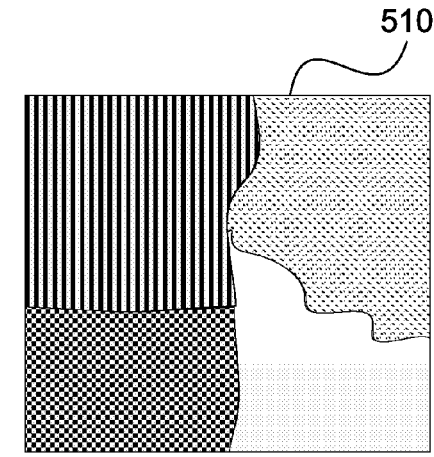
FIG. 5B shows the input image of FIG. 5A.
Figure 5C:
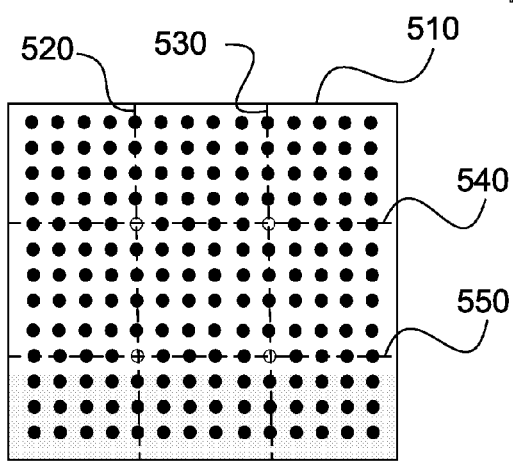
FIG. 5C shows four grid points in the image of FIG. 5A.
Figure 5D:
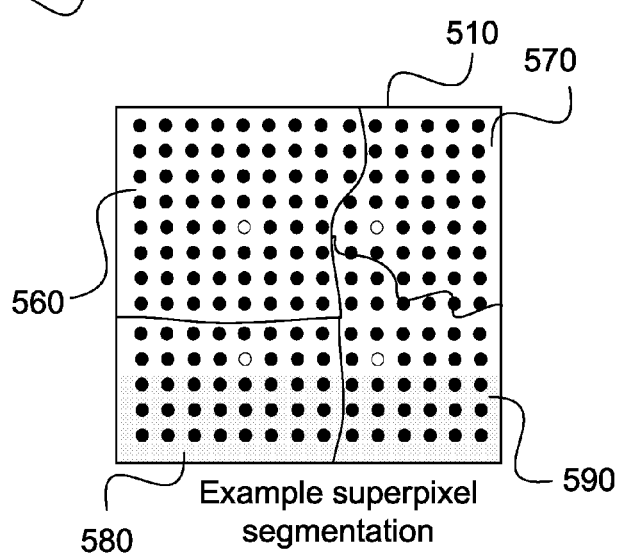
FIG. 5D shows a superpixel segmentation boundary of the image of FIG. 5A.

FIG. 5A shows pixels in an input image 510 as black circles. FIG. 5B schematically shows an input image 510 where actual image values are applied to the pixels of FIG. 5A. FIG. 5C shows the input image 510 with four (4) grid points, with the grid points shown as white circles at the intersection of grid lines 520, 530, 540, and 550. The grid points of FIG. 5C may then be used as seed points for superpixel segmentation, as in step 320 executed by the processor 105. FIG. 5D shows a possible superpixel segmentation of the image 510, where the image has been divided into four (4) superpixel visual elements 560, 570, 580, and 590.

Figure 6:
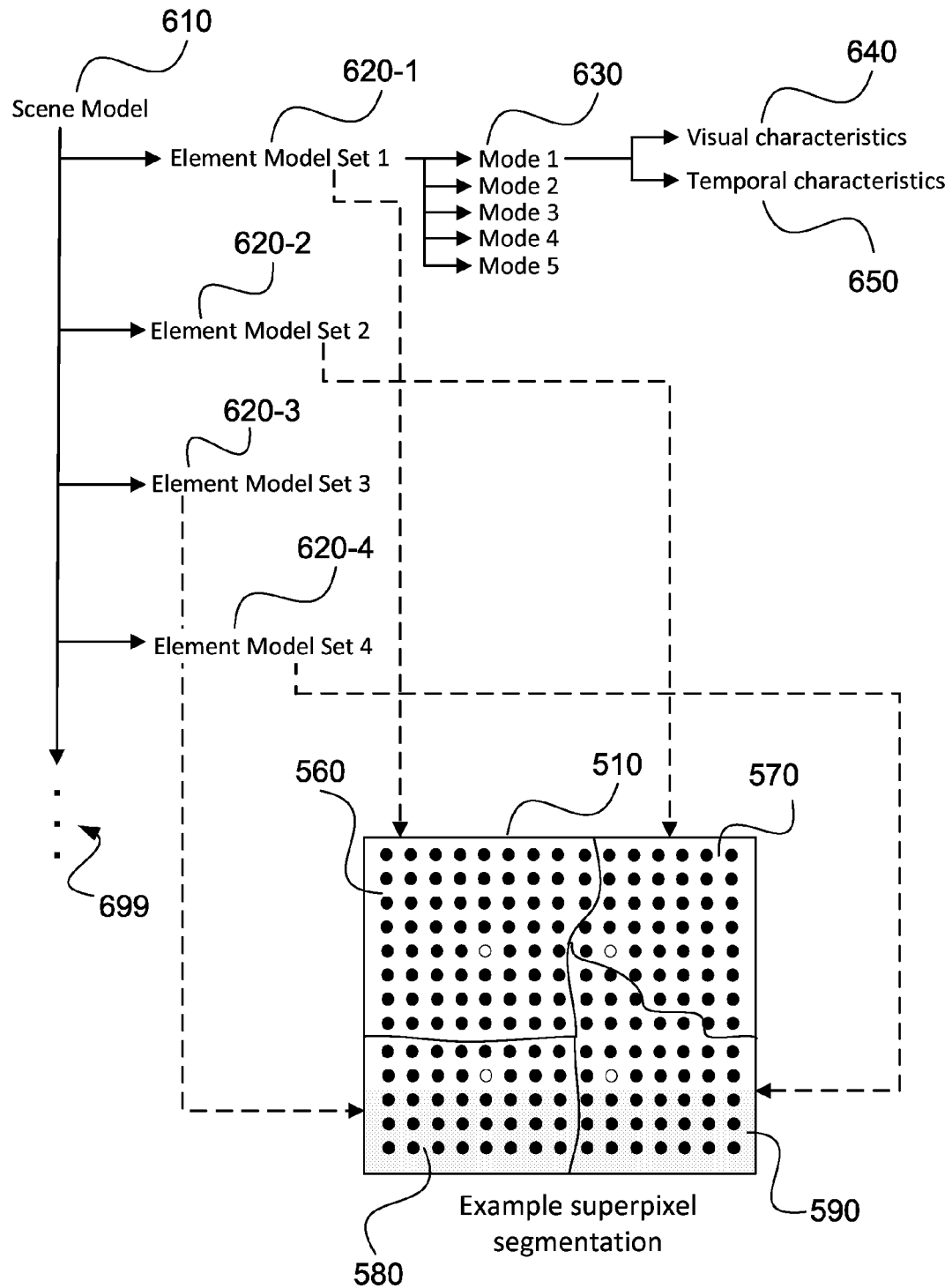
FIG. 6 shows a scene model consisting of element model sets and modes for the example of FIGS. 5A to 5D.

FIG. 6 gives an example of a scene model 610, showing four (4) element model sets 620-1, 620-2, 620-3, and 620-4, where other model sets, generally indicated at 699, are not illustrated for clarity. Each element model set 620-1 to 620-4 corresponds to an input superpixel visual element. In an exemplary arrangement, the superpixel seeds are set in a gridded layout (for example, in FIG. 5C), and the superpixel seeds are consistent (unchanged) from frame to frame. In this example, each superpixel visual element 560, 570, 580, and 590 as segmented from image 510 can be seen to have a direct correspondence to element model sets 620-1, 620-2, 620-3, and 620-4 respectively in the scene model 610.

An element model set (for example, 620-1) is an adaptive representation of a region. Before initialisation, each element model set 620-1 to 620-4 contains zero modes 630. After initialisation, each element model set 620-1 to 620-4 contains at least one mode 630. A mode 630 may also be referred to as a "mode model". A mode 630 is initialised using the corresponding superpixel visual element, for example 560. In an exemplary arrangement each element model set 620-1 to 620-4 contains a maximum of five (5) modes 630. In other arrangements, the maximum number of modes contained by each element model set 620-1 to 620-4 may be, but not limited to, four (4) modes 630, six (6) modes 630, or an unlimited number of modes 630. The maximum number of modes 630 per element model set 620-1 to 620-4 may depend on the scene characteristics. In a scene with a lot of foreground activity and changing background, more modes 630 may be required for scene modelling.

Each mode 630 contains a set of visual characteristics 640 and a set of temporal characteristics 650. In one arrangement, the set of visual characteristics 640 includes the visual attributes of the input superpixel visual elements, such as the average colour (for example, average Y, average Cb, average Cr) of each pixel in the superpixel. The set of temporal characteristics 650 includes temporal attributes of the mode. In one arrangement, the creation time of the mode is a temporal attribute. In another arrangement, the age of the mode is a temporal attribute, representing the time since creation. In yet another arrangement, hit count is a temporal attribute, representing how often a mode was matched with the observed scene. In yet another arrangement, deletion time of the mode is a temporal attribute, representing a future point in time where the mode should be purged if it is not encountered prior. In another arrangement, several attributes are combined. In one specific implementation, creation time and hit count are used as the temporal attributes.

A mode 630 is either a foreground mode or background mode at any given point in time. Over time, a foreground mode may become a background mode. An example of this is where a motor vehicle is driven into the scene, where such is interpreted as a foreground object, and is then parked. After a predetermined period of non-movement, that foreground object will typically be reclassified as a background object.

Returning to method 300, at classifying step 340, all of the input superpixel visual elements 560, 570, 580 and 590 are classified as either foreground or background by the processor 105, using the corresponding associated element model sets 620 from step 330. Each input superpixel visual element 560, 570, 580 and 590 is classified as foreground or background by finding a matching mode 630 from the associated element model set 620-1 to 620-4. If there is no matching mode, then "new mode" is selected, and the input visual element will be classified as foreground. A preferred method 700 of classifying a set of input superpixel visual elements 560, 570, 580 and 590 as either foreground or background using the associated element model sets 620-1 to 620-4, as executed in step 340 by the processor 105, will be described in detail below with reference to FIG. 7.

At updating step 350, the scene model 610 is updated. The initially matched modes from the classifying step 340 are updated using the corresponding input superpixel visual elements.

If "new mode" was selected in the classifying step 340, then a new mode is created at updating step 350. The creation of a new mode will now be described.

If the creation of a new mode would exceed any maximum number of modes per element model set 620-1 to 620-4, then one of the modes 630 in the element model set 620 is chosen for deletion. In one arrangement, the mode chosen for deletion is the mode with the closest deletion time. In another arrangement, the mode chosen for deletion is a foreground mode with the longest time since the mode was matched. In another arrangement, the mode chosen cannot be a background mode if only one background mode is present within the corresponding element model set. To create a new mode, the visual characteristics 640 of the new mode are initialised using the visual attributes of the corresponding input superpixel visual element. The temporal characteristics 650 are initialised as follows: hit count of the mode is set to 1; creation time of the mode is set to the current frame number; and the deletion time of the mode is set to the frame number plus an initial offset (for example, say, 8 frames).

If "new mode" was not selected in the classifying step 340 by the processor 105, then both the visual characteristics 640 and temporal characteristics 650 of the matched mode are updated at updating step 350.

The visual characteristics 640 of the matched mode are updated as follows. Each visual characteristic is updated using an approximated median filter, implemented by the processor 105 evaluating the below equation:

$$C_v^{new} = f(C_v^{prev}, C_v^i, LR_{max})$$

where $C_v^{prev}$ is the previous value of the visual characteristic v, $C_v^{new}$ is the updated value of the visual characteristic v, $f$ represents the approximated median updating function, $C_v^i$ is the corresponding value of the visual attribute from the corresponding input superpixel visual element, and $LR_{max}$ represents the largest allowable change for the visual characteristic v. The approximated median updating function $f(C_v^{prev}, C_v^i, LR_{max})$ is further defined in the equation, below:

$$C_v^{new} = \begin{cases} C_v^{prev} + \min(|C_v^{prev} - C_v^i|, LR_{max}), & C_v^{prev} \geq C_v^i \\ C_v^{prev} - \min(|C_v^{prev} - C_v^i|, LR_{max}), & \text{otherwise} \end{cases}$$

The temporal characteristics 650 of the matched mode are updated as follows. The hit count of the matched mode is incremented. The creation time of the matched mode is unchanged. The deletion time of the matched mode is updated by the processor 105 evaluating the equation:

$$DT = FN + x \times HC + \text{offset}$$

where DT is the new deletion time, FN is the current frame number, x is a scalar (for example, say, 4), HC is the hit count before being updated, and offset is the initial offset for a new mode described above (for example, say, 8).

Figure 11:
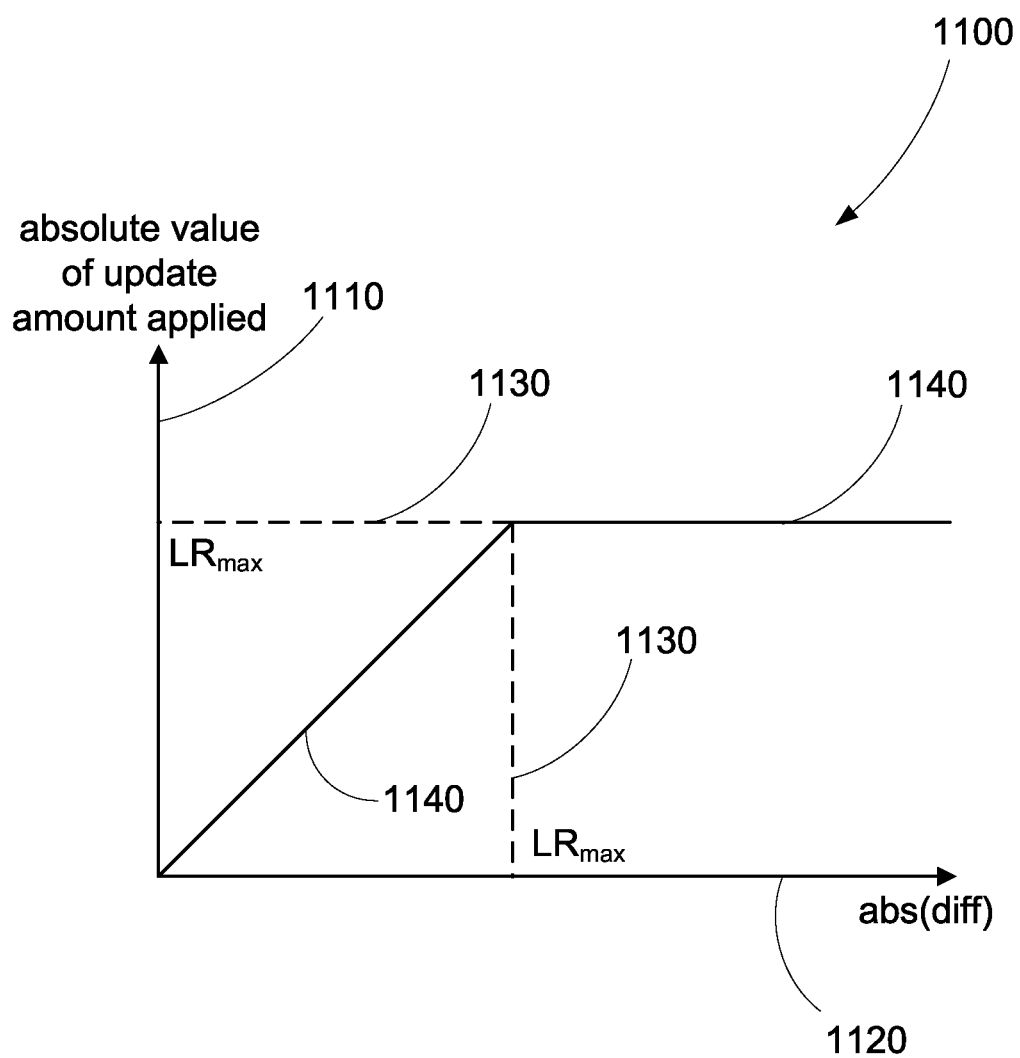
FIG. 11 is a graph that shows how the value of a learning rate threshold $LR_{max}$ controls maximum change in a visual characteristic value of a mode.

FIG. 11 is a graph 1100 that shows how the value of the learning rate threshold $LR_{max}$ controls a maximum change in the visual characteristic value per update. As shown in FIG. 11, the vertical axis 1110 on the graph 1100 is an absolute update amount to be applied to the visual characteristic value. The absolute update amount is added to the visual characteristic value for the mode where the input visual attribute value is greater than the visual characteristic value. The absolute update amount is subtracted from the visual characteristic value where the input visual attribute value is less than the visual characteristic value.

The horizontal axis 1120 on the graph 1100 is the absolute difference between the input visual attribute value and the visual characteristic value, which will be referred to below simply as the 'absolute difference'. The line 1140 represents an absolute update amount 1140 applied to the visual characteristic value, for a given absolute difference. When the absolute difference is less than the value of the learning rate threshold $LR_{max}$ 1130, then the absolute update amount 1140 is set to the value of the absolute difference. When the absolute difference is greater than or equal to the learning rate threshold $LR_{max}$ 1130, then the absolute update amount 1140 is set to the value of the learning rate threshold $LR_{max}$ 1130. The absolute update amount equation is shown below.

$$\text{absolute update amount} = \begin{cases} \text{absolute difference} & \text{absolute difference} < LR_{max} \\ LR_{max} & \text{otherwise} \end{cases}$$

Returning to method 300, following the updating of the model at step 350, at a connected component analysis step 360 the processor 105 combines neighbouring foreground pixels into blobs. A foreground pixel is a pixel that is within an input superpixel visual element that has been classified as foreground. A background pixel is a pixel that is within an input superpixel visual element that has been classified as background. Temporal statistics for each foreground blob are accumulated, using the corresponding matched mode for each input superpixel visual element in each blob. Segmentation of the image is then complete and the method 300 then ends.

Figure 7:
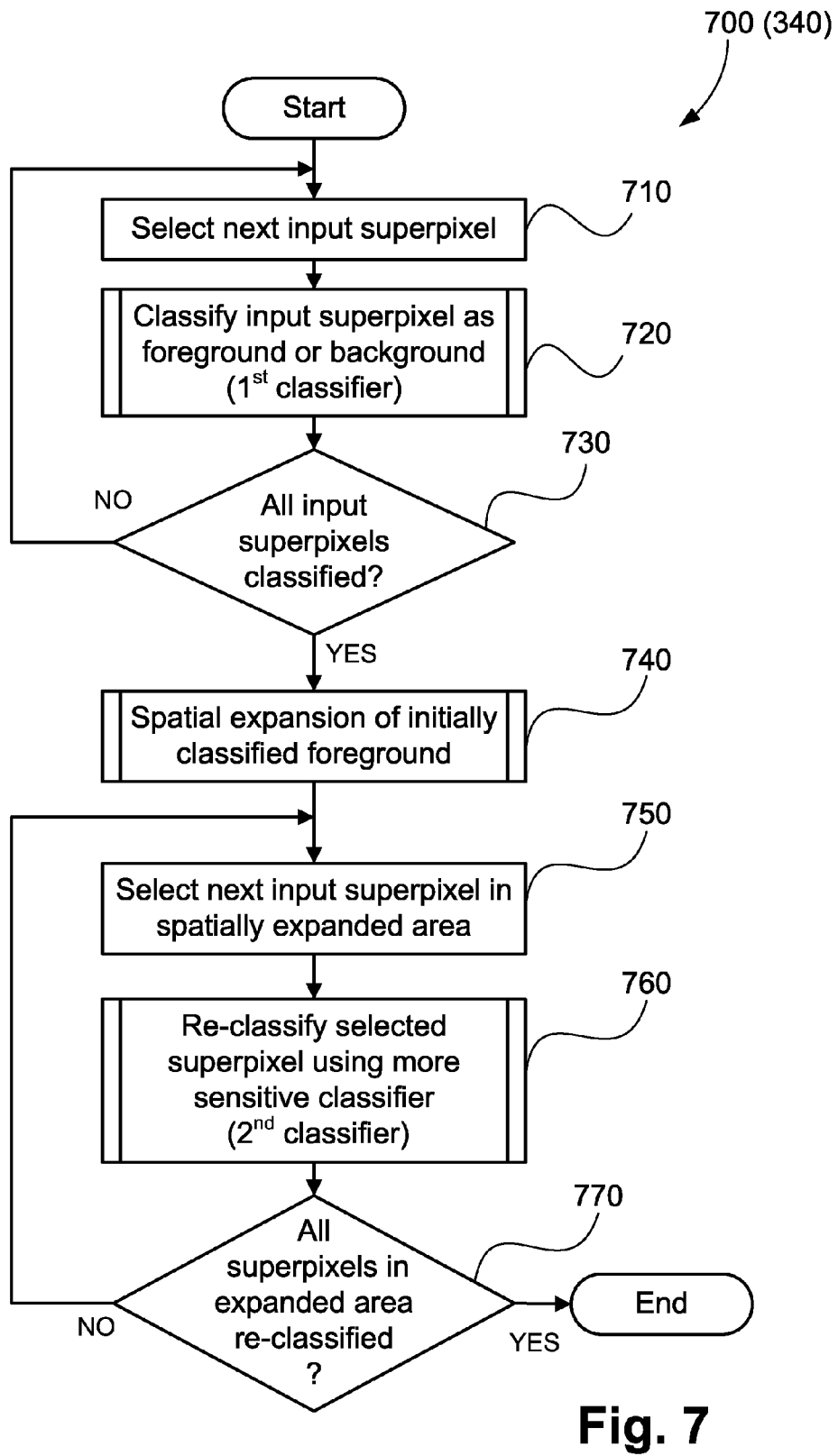
FIG. 7 is a schematic flow diagram illustrating a method of classifying all input superpixels in an input frame as either foreground or background.

FIG. 7 is a schematic flow diagram showing a preferred method 700 of classifying input superpixel visual elements as foreground or background, as executed at step 340. The method 700 may be implemented as one or more code modules of the software application program 133 resident in the storage module 109 of the camera 100 and being controlled in its execution by the processor 105. The method 700 processes input superpixel visual elements as segmented by the segmenting step 320.

Method 700 begins at selecting step 710, where the processor 105 selects the next input superpixel visual element to be classified.

At an initial classifying step 720 (first classifier), the selected input superpixel visual element is classified as either foreground or background by finding the best matching mode 630 from the associated element model set (for example, 620-1) in the scene model 610 as associated by spatial determining step 330 executed by the processor 105. In practice, each visual element in the image has an associated visual element in the corresponding scene model. Each segmented superpixel of the image is therefore associated with, or maps to an associated element in the scene model. A preferred method 800 of initially classifying an input superpixel visual element as either foreground or background using the associated element model set (for example, 620-1), as executed in step 720 by the processor 105, will be described in detail below with reference to FIG. 8.

At the decision step 730, the processor 105 checks to determine if all of the input superpixel visual elements have been classified. Where the processor 105 determines that all of the input superpixel visual elements have been classified, then the method 700 proceeds to a spatial expansion step 740. Otherwise, if there are remaining unclassified input superpixel visual elements, then the method 700 returns to the selecting step 710 to classify the remaining input superpixel visual elements.

At the spatial expansion step 740, the processor 105 identifies certain input superpixel visual elements which were initially classified as background by the initial classifying step 720 and which are likely candidates for reclassification by a more sensitive classifier. "Sensitivity" in this sense is how easily the classifier detects foreground. The identified input superpixel visual elements may have been incorrectly classified by the initial classifying step 720. A particular method 900 of spatial expansion of initially classified foreground, as executed in spatial step 740 by the processor 105, will be described in detail below with reference to FIG. 9. Further methods of spatial expansion will be also described below in addition to FIG. 9. Step 740 results in a spatially expanded area of foreground input superpixel visual elements, by which certain foreground elements are expanded into initially classified background elements.

At selecting step 750, the processor 105 selects the next input superpixel visual element to be re-classified in the spatially expanded area created by step 740, as executed by the processor 105.

At re-classifying step 760 (second classifier), the processor 105 re-classifies the input superpixel visual element selected by step 750 as either foreground or background using a classifier that is more sensitive to foreground than the initial classifier used in step 720. A method 1000 of re-classifying an input superpixel visual element in the spatially expanded area identified by step 740, as executed in step 760 by the processor 105, will be described in detail below with reference to FIG. 10.

The classifier that is more sensitive to foreground used at step 760 has a smaller number of possible matches than the initial classifier used at step 720. Consider a set of visual characteristics 640 for a given mode 630. The possible values of the visual attributes for all matching input superpixel visual elements occupy an N-dimensional space, where N is the number visual attributes, and where the number of the visual attributes and the number of the visual characteristics must be the same.

We can define the N-dimensional volume of space occupied by all possible matches for the initial classifier at step 720 as $M_I$, and the N-dimensional volume of space occupied by all possible matches for the classifier that is more sensitive to foreground used at step 760 as $M_S$. It must be the volume of $M_S$ is smaller than the volume of $M_I$, however $M_S$ is not necessarily a subset of $M_I$. As the match class is background, and that $M_I > M_S$, it can therefore be said that the classifier used at step 760 is more sensitive to foreground than the classifier used at step 720.

Thus, the second classifier, as used at step 760, is less likely to match any given input superpixel visual element to the scene model than the first classifier used at step 720.

At decision step 770, the processor 105 checks if all of the input superpixel visual elements identified by step 740 have been re-classified. Where the processor 105 determines that all of the input superpixel visual elements identified by step 740 have been re-classified, then the method 700 terminates. Otherwise, if there are remaining input superpixel visual elements in the spatially expanded area that have not been re-classified, then the method 700 returns to the selecting step 750.

Figure 8:
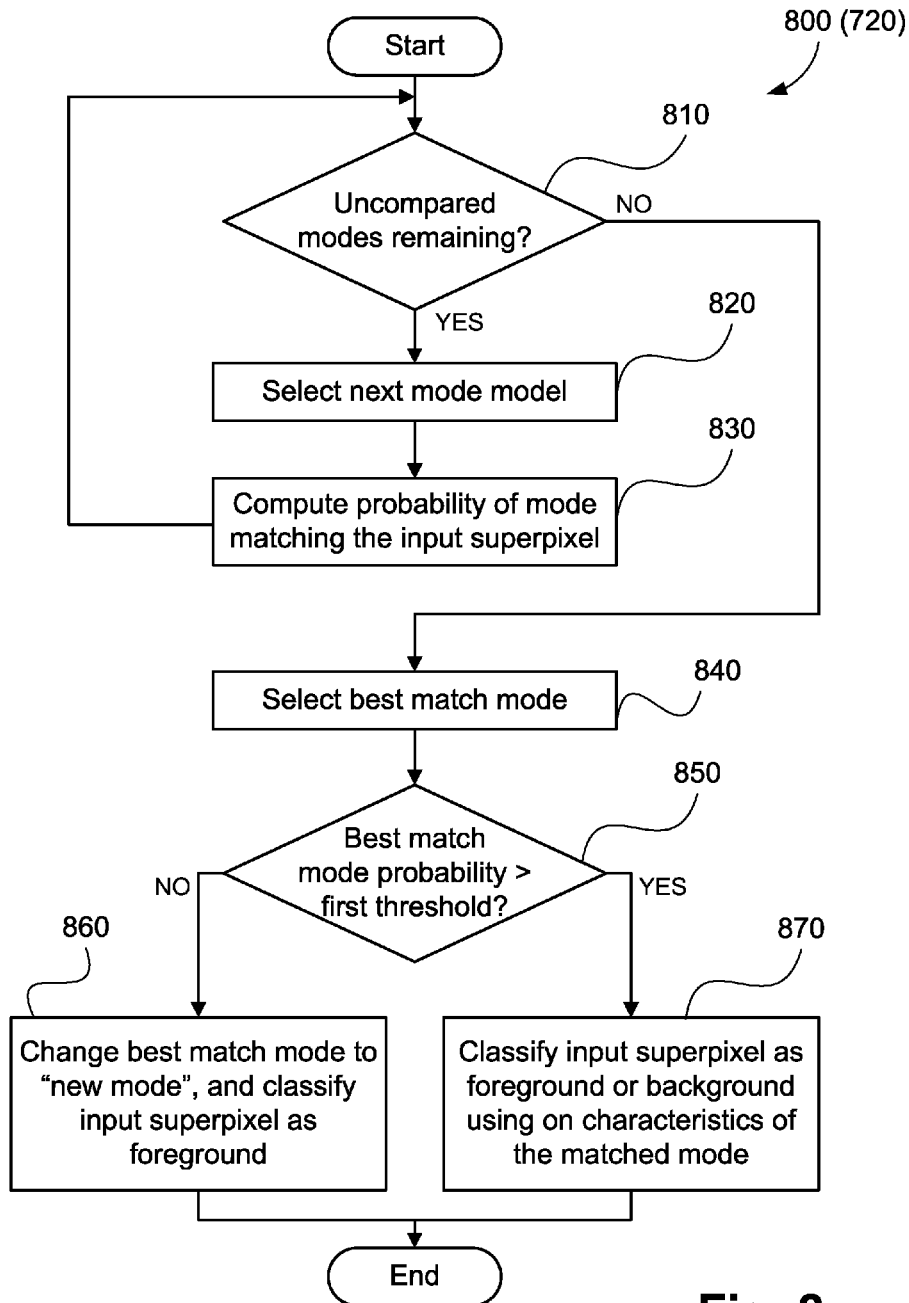
FIG. 8 is a schematic flow diagram illustrating a method of initially classifying an input superpixel as either foreground or background.

FIG. 8 is a schematic flow diagram showing a method 800 of initially classifying an input superpixel visual element as foreground or background, as executed at step 720 by the processor 105. The method 800 may be implemented as one or more code modules of the software application program 133 resident in the storage module 109 of the camera 100 and being controlled in its execution by the processor 105. The method 800 initially classifies an input superpixel visual element that has been segmented by the segmenting step 320 and has been associated with an element model set 620 by the determining step 330, as executed by the processor 105.

Method 800 begins at decision step 810, where the processor 105 checks if all of the modes 630 in the element model set (for example, 620-1) have been compared to the input superpixel visual element. The input superpixel visual element was selected by selecting step 710. The element model set (for example, 620-1) was the element model set that was associated with the input superpixel visual element by determining step 330.

If all of the modes 630 have been compared to the input superpixel visual element, then the method 800 proceeds to a best match selecting step 840. Otherwise, if there are modes 630 in the element model set (for example, 620-1) that have not been compared to the input superpixel visual element, then the method 800 proceeds to a next mode selecting step 820.

At the next mode selecting step 820, the processor 105 selects the next mode 630 in the element model set 620-1 to be compared to the associated input superpixel visual element.

At a computing step 830, the processor 105 computes the probability of the mode 630, selected by selecting step 820, matching the input superpixel visual element selected by selecting step 710.

In an exemplary arrangement, the probability is determined by the processor 105 via probabilistic modelling of a two class classification containing a match class and a non-match class. The match class assumes that the mode 630 is a match to the input superpixel visual element, and the non-match class assumes the mode 630 does do not match the input superpixel visual element.

The probability calculation uses a set of features $f$. The set of features $f$ for the probability calculation contains the differences between the input superpixel visual attributes and the visual characteristics 640 in the mode 630. In such an arrangement using the set of features $f$, the match score lies between zero (0) and one (1), inclusive, where zero (0) represents no-match and one (1) represents a perfect match. In a Bayesian sense, the probability of the mode 630 matching the input visual superpixel given the set of features $f$ can be expressed as p(match|$f$), which is shown in the equation below. A prior of 50% for the match class is assumed (that is, match and non-match are equally probable).

$$p(\text{match}|f) = \frac{p(f|\text{match})}{p(f|\text{match}) + p(f|!\text{match})}$$

In one arrangement, the match class is modelled as a Gaussian distribution while the non-match class is modelled as a uniform distribution (that is, there is no assumption on the values for the non-match class, all values are equally probable). The equation for the match class p($f$|match), assuming a Gaussian distribution, is shown below.

$$p(f|\text{match}) = \frac{1}{(2\pi)^{0.5D}\sqrt{|\Sigma|}}\exp\left(\frac{1}{2}[f-\mu]^T\Sigma^{-1}[f-\mu]\right)$$

where $\Sigma$ is the covariance matrix for the features, D is the number of input superpixel visual element attributes and $\mu$ is the mean vector for the features. The covariance matrix $\Sigma$ and mean vector $\mu$ may be learnt using predetermined training data and applied for the entire scene, or may be separately maintained for each individual mode, or may be separately maintained for each individual element model. The training data is used to learn the values beforehand, so the actual data used to train with does not need to be stored in the end product, the segmented image data.

In one arrangement, it is assumed that the features are independent, so the covariance matrix is diagonal. In this arrangement, the p($f$|match) equation degenerates into a multiplication of three separate Gaussians. In some implementations, it can be assumed that the means of the features are zero, so the mean vector $\mu$ may be removed from the p($f$|match) equation.

The equation for the non-match class p($f$|!match) is shown in the equation below.

$$p(f|!\text{match}) = \frac{1}{\prod_{n=1}^{D}\text{range}(f_n)}$$

where range($f_n$) is the range of the nth feature.

In another arrangement, a probabilistic Support Vector Machine (SVM) classifier can be used to calculate match/non-match probability.

On conclusion of step 830 for the mode model, the method 800 returns to step 810.

At the best match selecting step 840, the processor 105 selects the mode 630 that had the best probability, as calculated by the processor 105 at the computing step 830. The best match mode is the mode with the best probability. If there were no modes 630 in the element model set 620 (i.e. prior to initialisation), then a minimum probability (for example, 0.0) is stored in RAM memory 170. Otherwise, the best match probability and the best match mode are stored by the processor 105 in RAM memory 170.

At decision step 850 the processor 105 checks if the best match probability is greater than a first threshold (for example, say, 0.7). If the best match probability is greater than a first threshold, then the method 800 proceeds to step 870. Otherwise, if the best match probability is less than or equal to a first threshold, then the method 800 proceeds to step 860. The first threshold is typically predetermined according to empirical results or observations, and is stored in the RAM 170 as a parameter. Alternatively the threshold may be machine learnt or determined by user.

At changing step 860 the processor 105 changes the stored best mode match, stored by the processor 105 in RAM memory 170, to "new mode", and classifies the input superpixel visual element as foreground.

At classifying step 870 the processor uses the temporal characteristics 650 of the best match mode to classify the input superpixel visual element as either foreground or background. In one arrangement, once the age of the matched mode is has passed an age threshold, then the mode is a background mode and any input superpixel visual elements that match that mode will be classified as background.

The method 800 then ends, returning processing to step 730.

Figure 9:
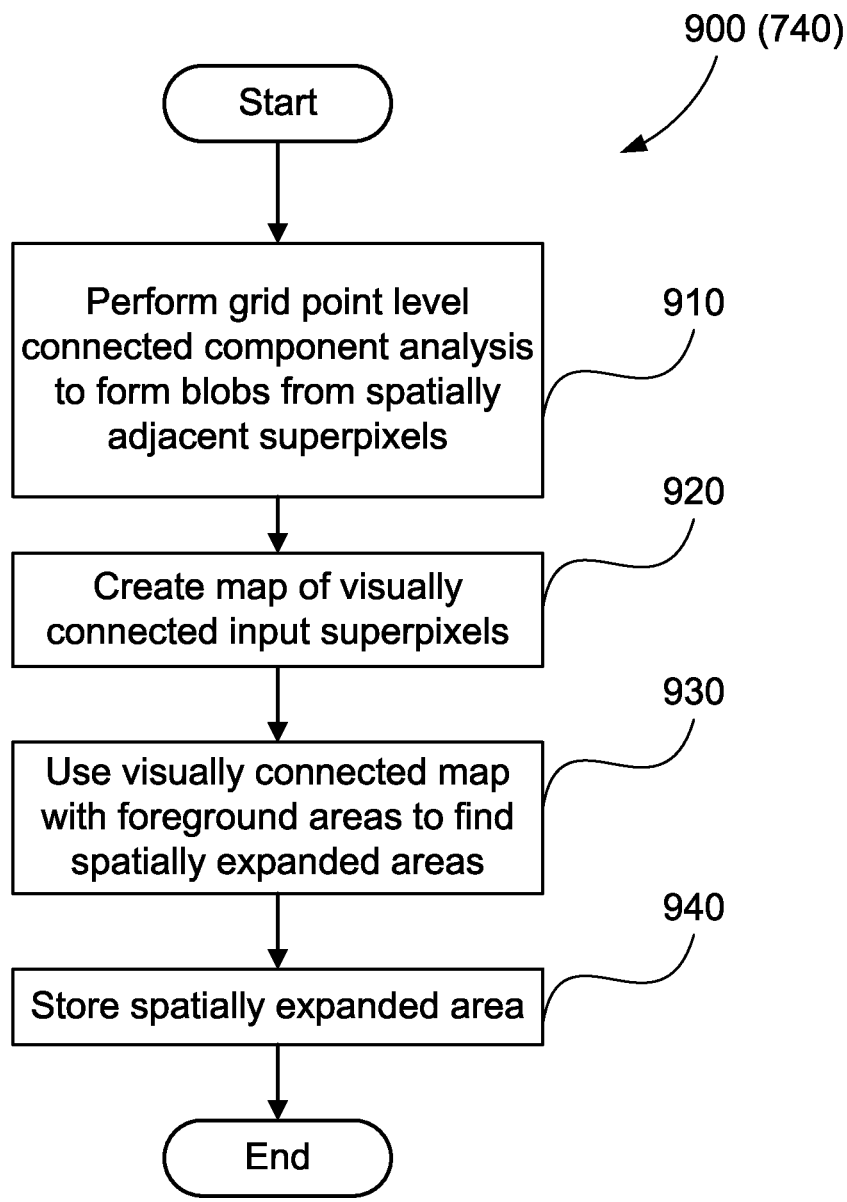
FIG. 9 is a schematic flow diagram illustrating a method of spatial expansion of detected foreground.

FIG. 9 is a schematic flow diagram showing a preferred method 900 of spatial expansion of detected foreground, as executed by in the spatial expansion step 740 the processor 105. The method 900 may be implemented as one or more code modules of the software application program 133 resident in the storage module 109 of the camera 100 and being controlled in its execution by the processor 105.

The spatially expanded area contains certain ones of those input superpixel visual elements that were initially classified as background. The input superpixel visual elements in the spatially expanded area may have been misclassified as background by the initial classifying step 720. By restricting the spatial expansion to areas around initially foreground, the present inventors make the assumption that misclassification of foreground (that is, foreground that was classified as background) in the initial classifying step 720, is most likely to occur around detected foreground areas.

One reason for the misclassification of foreground as background is that the initial classifying step 720 used a classifier that under detects foreground (that is, the first classifier over matched input superpixel visual elements to background modes).

There are several reasons for the over matching to background during the initial classifying step 720, described as follows.

There are a wide variety of environmental effects (for example, local lighting changes, dynamic background, shadow, and video noise) that can affect the attributes of an input superpixel visual element. Additionally, superpixel segmentation can be inconsistent from frame to frame. Also, intuitively and empirically, the variance of a superpixel from frame to frame is larger than the variance of individual pixels as the superpixel is made up of a large number, say 100, of pixels. Thus, the variance over time of an input superpixel visual element corresponding to an unchanged area of the scene is typically larger than nearly all of the individual variances of each of the pixels.

If the initial classifier sensitivity (for example, adjusting the classifier values in computing step 830) was increased or the first threshold was decreased in the decision step 850, then the number of misclassified foreground input superpixel visual elements would be decreased. However, the number of misclassified background (that is, background detected as foreground) input superpixel visual elements would be increased. Misclassified background superpixel visual elements (say, 2-3 superpixels) are hard to filter, particularly when they are spatially co-located as they can correspond to a large number of connected pixels (for example, 200-300 pixels). In a typical scenario, 150 to 200 pixels may be the size of the minimum object to be detected, making it difficult to filter misdetections that are larger than 200-300 pixels. Methods such as median filters, morphological filters, and filtering of small blobs, will generally not deal with such large areas of connected misclassified pixels.

For pixel level algorithms, a small number of spatially co-located misclassified background pixels (say, 5-10 pixels) are much easier to filter. Thus, as pixels also have a lower variance over time than superpixels, the initial classifying step 720 can be slightly more sensitive for pixel visual elements (for example, pixel level algorithms could have narrower Gaussian distributions or higher probability thresholds). However, the arrangements described are also applicable to pixel level algorithms that suffer from large areas of misclassified foreground.

The method 900 begins at a merging step 910, where the processor 105 performs a grid point (seed or superpixel) level connected component analysis. Neighbouring input superpixel visual elements that were classified as foreground by the initial classifying step 720 are formed into the same blob. This step does not involve merging adjacent foreground superpixels, but rather, and more simply, just identifies larger spatially adjacent regions classified as foreground. The boundary of the blob (larger region) is the outer boundary of those connected superpixels classified as foreground.

In one arrangement, neighbouring input superpixel visual elements are defined using their grid points (original seed locations). For example, consider the grid points in raster scan (row major) order for an image with 60 grid points per row. For a 4-way grid point level connected component analysis, the neighbours of grid point 0 are grid point 1 and grid point 60, and the neighbours of grid point 61 are grid point 1, grid point 62, grid point 122, and grid point 60. For an 8-way grid point level connected component analysis, the neighbours of grid point 0 are grid point 1, grid point 61 and grid point 60, and the neighbours of grid point 61 are grid point 1, grid point 2, grid point 62, grid point 122, grid point 121, grid point 120, grid point 60 and grid point 0. In one arrangement, a 4-way connected component analysis is done at the grid point level. In another arrangement, an 8-way connected component analysis is done at the grid point level.

Note that superpixels are dynamic and irregularly shaped visual elements, and thus at the pixel level a superpixel may not actually be touching their grid point level neighbours, or may be touching other superpixels that are not their grid point level neighbours. Using the grid point level neighbours for connected component analysis, however, makes the connected component analysis simpler and faster than using the pixel level connectedness of the input superpixel visual elements, and is generally a fair approximation of the real connectivity.

In another arrangement, neighbouring input superpixel visual elements are defined by analysing the connectivity of the superpixels at the pixel level. For example, if any pixel in input superpixel visual element 0 has a neighbouring pixel in input superpixel visual element 3, then input superpixel visual element 0 and input superpixel visual element 3 are neighbours. Likewise, if input superpixel visual element 0 does not have a neighbouring pixel in input superpixel visual element 60, then input superpixel visual element 0 and input superpixel visual element 60 are not neighbours.

Figure 14:
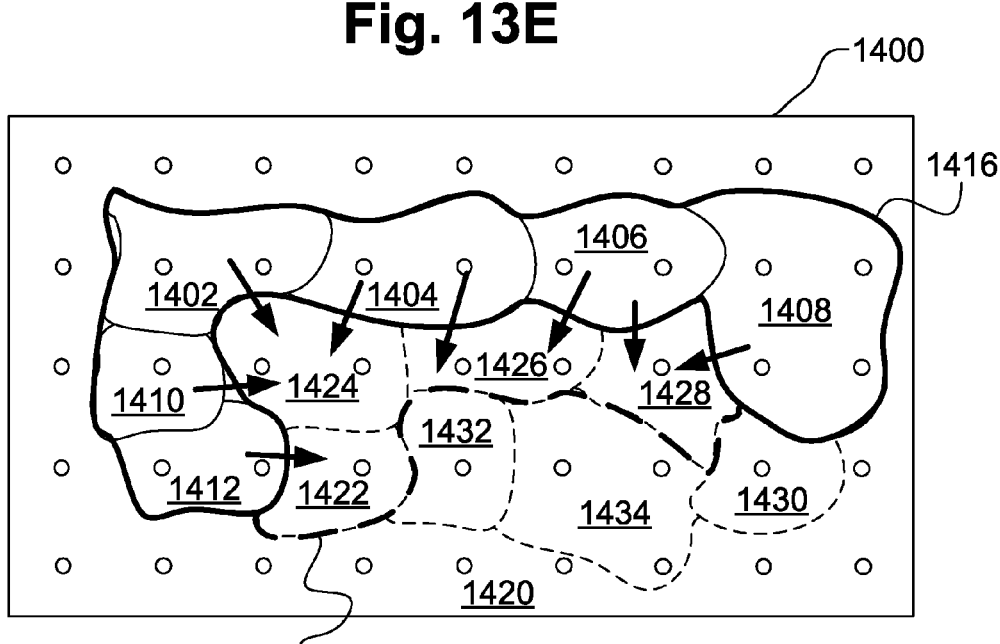
FIG. 14 schematically depicts an example of expansion of a foreground blob bounding box.

The end result of step 910 is the image divided by, typically, a number of foreground areas (blobs), all separated by background areas. The foreground blobs are the basis for the spatial expansion, to create the spatially expanded areas. A generalised example of this is illustrated in FIG. 14 for an image 1400 that has initially classified foreground superpixels 1402-1412, separated by thin solid lines, and initially classified background superpixels 1420-1434, separated by thin dashed lines. During step 910, adjacent foreground superpixels are formed into a blob defined by a boundary 1416 (thick solid line). A bounding box can be formed around the blob defined by the boundary 1416, such the bounding box encloses all of the initially classified foreground superpixels 1402-1412. The top of the bounding box would be the top most of the initially classified foreground superpixels 1402-1412, the left edge of the bounding box would be the left most of the initially classified foreground superpixels 1402-1412, the bottom of the bounding box would be the bottom most of the initially classified foreground superpixels 1402-1412, and the right edge of the bounding box would be the right most of the initially classified foreground superpixels 1402-1412.

At a creating step 920, which follows step 920, the processor 105 creates a binary mask (see FIGS. 12A-12C) indicating visually connected input superpixel visual elements. In another arrangement, the processor 105 may create a graph indicating visually connected input superpixel visual elements. Each may be considered a map of visually connect input superpixels. Visually connected input superpixel visual elements are input superpixel visual elements that have similar visual attributes, for example, similar colour. In one arrangement, visually connectivity is determined using the same classifier as used for calculating the probability for mode matching at computing step 830. In another arrangement, visually connectivity is determined using the same classifier used at computing step 1020, to be described. In another arrangement, visual connectivity is determined using an SVM. In another arrangement, the Euclidean distance between the two visual attribute vectors is used. Other arrangements may use similar methods to those stated above, for example, the $L_1$ norm or the angle between the vectors.

Step 930 then operates whereby the processor 105 uses the visually connected map/mask with foreground areas to find all the spatially expanded areas. The spatially expanded areas are formed of input superpixel visual elements that were initially classified as background and that the visually connected map/mask FIGS. 12A-12C indicates are visually connected to foreground areas. In a preferred implementation of step 930, the processor 105 applies a predetermined structuring element (for example, say, a 5×5 grid point window) to all input superpixel visual elements that were classified as foreground by the first classifier of the initial classifying step 720.

In one arrangement, the spatially expanded area includes all input superpixel visual elements that were classified as background by the initial classifying step 720 and that are both visually connected to a foreground input superpixel visual element, and are within the structuring element applied to that foreground input superpixel visual element as applied at step 930.

In one arrangement, bounding boxes for the blobs created by the performing step 910 are used to help refine the spatially expanded area. In one arrangement, the spatially expanded area cannot include input superpixel visual elements that are outside of a blob bounding box. In another arrangement, the blob bounding boxes are allowed to be expanded asymmetrically. As shadow normally occurs at the bottom of an object (since light sources are typically above the object (e.g. a motor vehicle) and the field of view of the camera 100), the bottom of the blob bounding box is not allowed to be expanded by as much as the top and the sides of the blob bounding box. For example, the top edge of the bounding box may be allowed to expand by two (2) grid points, the left and right sides of the blob bounding box may both be allowed to expand by one (1) grid point, and the bottom edge of the blob bounding box may be allowed to expand by zero (0) grid points. In this fashion, spatial expansion in a downward direction may be configured to be less than spatial expansion in other directions.

In another arrangement, the structuring element, such as a binary mask, indicating visually connected input superpixel visual elements, is not used to create the spatially expanded area. Instead, all visually connected input superpixel visual elements within a blob bounding box are included in the spatially expanded area (similar to an infinite structuring element constrained by the blob bounding box). In another arrangement, the blob bounding box is allowed to be expanded asymmetrically. In another arrangement, the blob bounding box is allowed to be expanded symmetrically.

In another arrangement, all input superpixel visual elements within a blob bounding box are included in the spatially expanded area. In another arrangement, the blob bounding box is expanded asymmetrically by a predetermined number of grid points. In another, the blob bounding box is expanded symmetrically by a predetermined number of grid points.

In another arrangement, all input superpixel visual elements within a window (say, 5×5 grid points) of a foreground input superpixel visual element is included in the spatially expanded area. In another arrangement, the window is asymmetrical.

In another arrangement, the blob must be a minimum size of either pixels or grid points before being used as a basis to determine the spatially expanded area. This prevents small, isolated misdetections (e.g. from dynamic background) from affecting the spatially expanded area.

If a pixel visual element or another fine visual element (as opposed to a coarse visual element, e.g. superpixel or 8×8 DCT block) was used, then a larger structuring element should be used. That is, the spatially expanded area should have a larger number of visual elements.

With reference to the illustrative example of FIG. 14, steps 930 and 940 can result in certain ones of the initially classified background superpixels (i.e. 1422-1428) being accepted into an expansion of the foreground superpixels (as depicted by the various directional arrows in FIG. 14). The spatially expanded area would consist of superpixels 1422, 1424, 1426, and 1428, enclosed by the thick dashed boundary 1418. The second classifier is applied to the superpixels that were initially classified as background. Applying the second classifier to the foreground areas would be redundant, as it would only confirm the initial classification by the first classifier.

At storing step 940, the processor 105 stores the visual elements in the spatially expanded area into the memory 170 to later be re-classified using the more sensitive (second) classifier of step 760.

Figure 10:
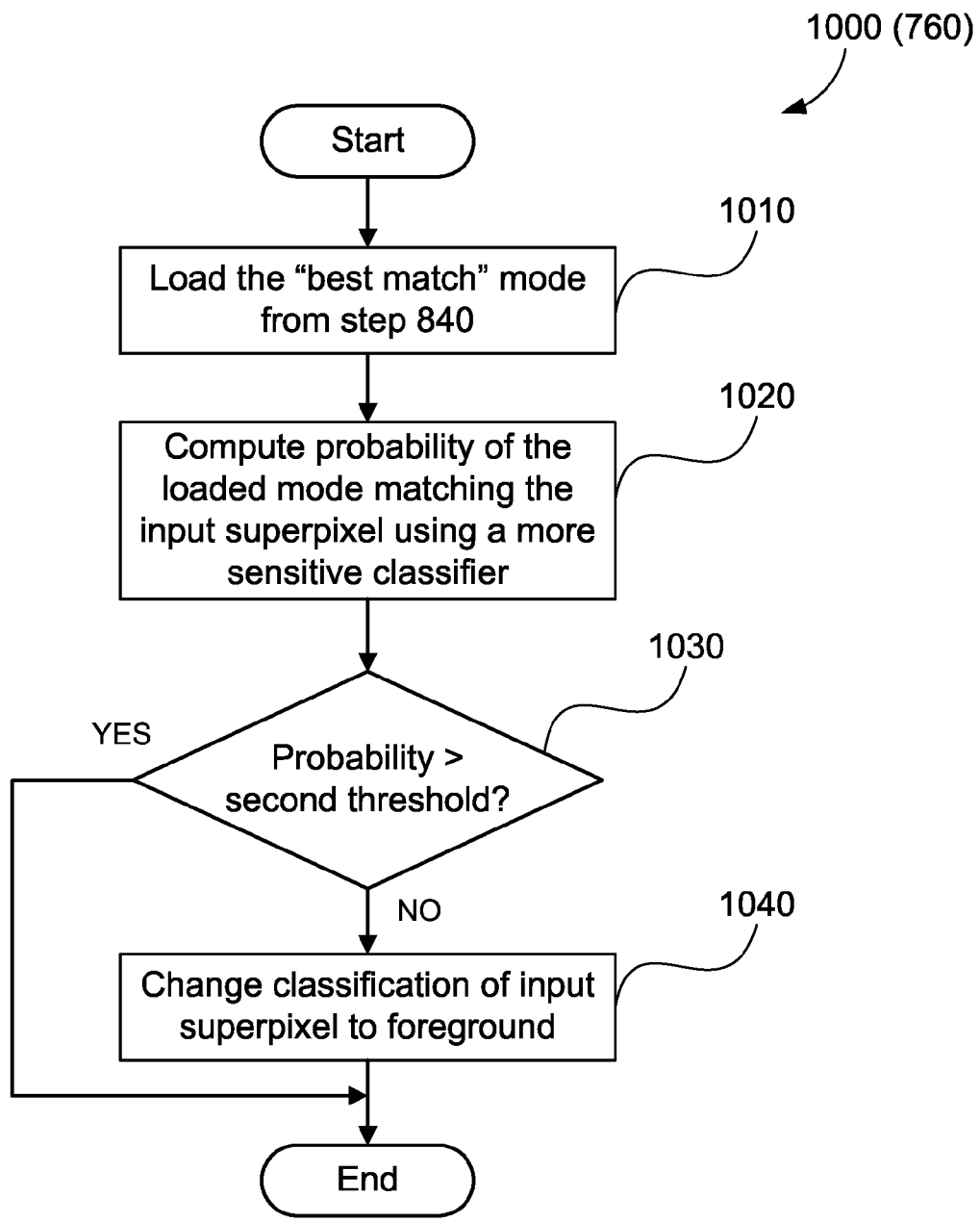
FIG. 10 is a schematic flow diagram illustrating a method of classifying the superpixels in the spatially expanded area as either foreground or background.

FIG. 10 is a schematic flow diagram showing a preferred method 1000 of re-classifying an input superpixel visual element using a more sensitive (second) classifier, compared with that of the (first) classifier used at step 720 and subsidiary computing step 830, as executed by the processor 105. The method 1000 re-classifies a background input superpixel visual element that is within the spatially expanded area created by the spatial expansion step 740, as executed by the processor 105. The input superpixel visual element has been previously associated with an element model set 620 by the determining step 330.

Method 1000 begins at loading step 1010, where the processor 105 loads the best match mode stored by the processor 105 from RAM memory 170 at the best match selecting step 840.

At computing step 1020, the processor 105 computes the probability of the input superpixel visual element matching the mode loaded by the loading step 1010. In an exemplary arrangement, the probability is determined by the processor 105 via probabilistic modelling of a two class classification containing a match and a non-match class. In another arrangement, a probabilistic Support Vector Machine (SVM) classifier is used to calculate match/non-match probability.

The computing step 1020 uses a more sensitive classifier than the initial classifier used by the computing step 830 in the method 800. The more sensitive classifier used by step 1020 may match a lower number of best match modes.

In one arrangement, both classifiers from the computing step 1020 and the computing step 830 assume a Gaussian distribution. In another arrangement, a different classifier is used for the computing step 830 (say, a Bayesian classifier, assuming a Gaussian distribution for the match class and non-match class) and the computing step 1020 (say, a probabilistic SVM). In another arrangement, both the computing step 830 and the computing step 1020 use the same classifier with different parameters (say, Gaussian distributions where the computing step 1020 has smaller sigma values). In one arrangement, the smaller sigma values are set empirically. In another arrangement, for a given set of training data (for example, a set of training data containing misclassified foreground and true positive background spatially connected to foreground) the smaller sigma values are chosen so they minimise the amount of misclassifications.

The Gaussian distributions or weights for the more sensitive classifier will typically not be uniformly more sensitive than the initial classifier. As it is assumed that the input superpixel visual elements in the spatially expanded area are not subject to environmental effects (for example, local lighting change, dynamic background, shadow, and video noise), then the sensitivity must change appropriately for each feature. For example, the sensitivity to the luminance feature will be increased more than the chrominance features, as environmental effects like local lighting change and shadow typically affect the luminance channel more than the chrominance channel.

In another arrangement, all modes 630 in the element model set 620, rather than the best match mode stored by the processor 105 at the best match selecting step 840, are considered.

At decision step 1030, the processor checks if the probability calculated by the computing step 1020 is greater than a second threshold (for example, say, 0.7), again predetermined and stored akin to the first threshold. If the computed probability is greater than a second threshold, then the method 1030 terminates. Otherwise, if the probability is less than or equal to the second threshold, then the classification of the input superpixel visual element is changed from background to foreground by the changing step 1040.

Examples/User Cases

Figure 12A:
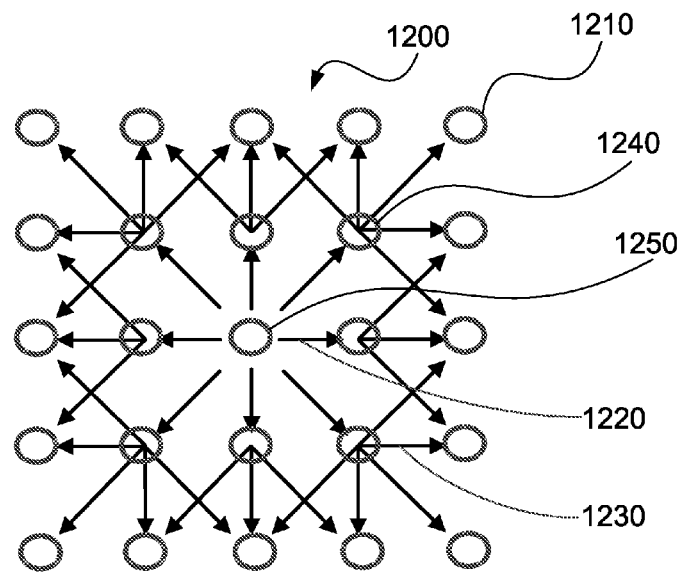
FIG. 12A is an example how visual connectivity of grid points may be determined when using a 5×5 grid point structuring element.

FIG. 12A shows an example how a binary connectivity mask is efficiently created when using a 5×5 grid point structuring element 1200. The circles represent grid points (seed points) (for example, grid point 1210, grid point 1240, and grid point 1250) for an image. The 5×5 structuring elements will represent the visual connectivity for the centre grid point 1250.

Figure 12B:
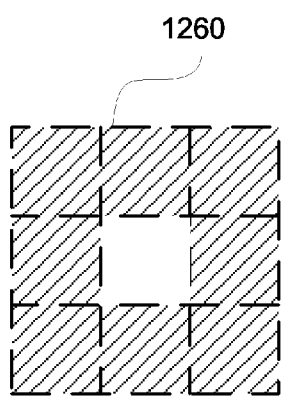
FIGS. 12B and 12C show masks derived from the arrangement of FIG. 12A

Firstly, an 8-bit binary mask 1260 shown in FIG. 12B is created representing the visual connectivity of the centre grid point 1250 to the eight (8) inner neighbours (for example, 1240) for the centre grid point 1250. A bit value of "1" indicates the corresponding inner neighbour (for example, grid point 1240) is visually connected to the centre grid point 1250. A bit value of "0" indicates the corresponding inner neighbour (for example, grid point 1240) is not visually connected to the centre grid point 1250. The inner eight (8) arrows (for example, 1220) indicate how the centre grid point 1250 may be connected to the eight (8) inner neighbours neighbour (for example, grid point 1240).

Figure 12C:
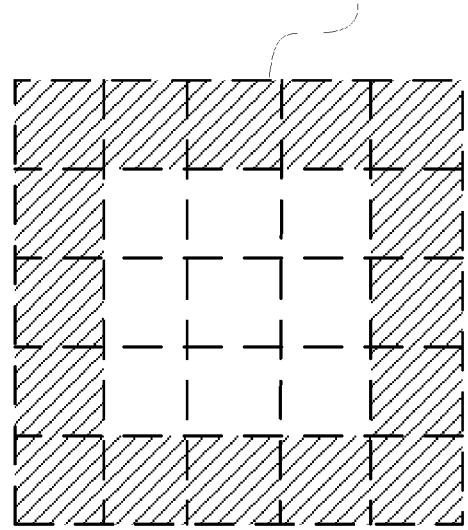

Secondly, a 16-bit binary mask 1270 shown in FIG. 12C is created representing the visual connectivity of the centre grid 1250 point to the outer sixteen (16) grid points (for example, 1210). A bit value of "1" indicates the corresponding outer grid point (for example, grid point 1210) is visually connected to the centre grid point 1250. A bit value of "0" indicates the corresponding outer grid point (for example, grid point 1210) is not visually connected to the centre grid point 1250. As such, application of the structuring element, formed by the masks 1260 and 1270, to the visually connected visual elements operates to define or identify those visually connected visual elements that can be added to the spatially expanded area.

It is assumed that a path from the centre point 1250 to the outer sixteen (16) grid points (for example, grid point 1210) can only be achieved directly through the inner eight (8) neighbours (for example, grid point 1240). An example of a possible path from the inner eight (8) neighbours to the outer sixteen (16) grid points is shown by the arrow 1230.

Thus, for an outer grid point (for example, 1210) to be visually connected to the centre grid point 1250, one of the inner neighbours (in this case, 1240) must first be visually connected to the centre grid point 1250. Then, the visually connected inner neighbour 1240 must also be visually connected to the outer grid point 1240.

Figure 13A:
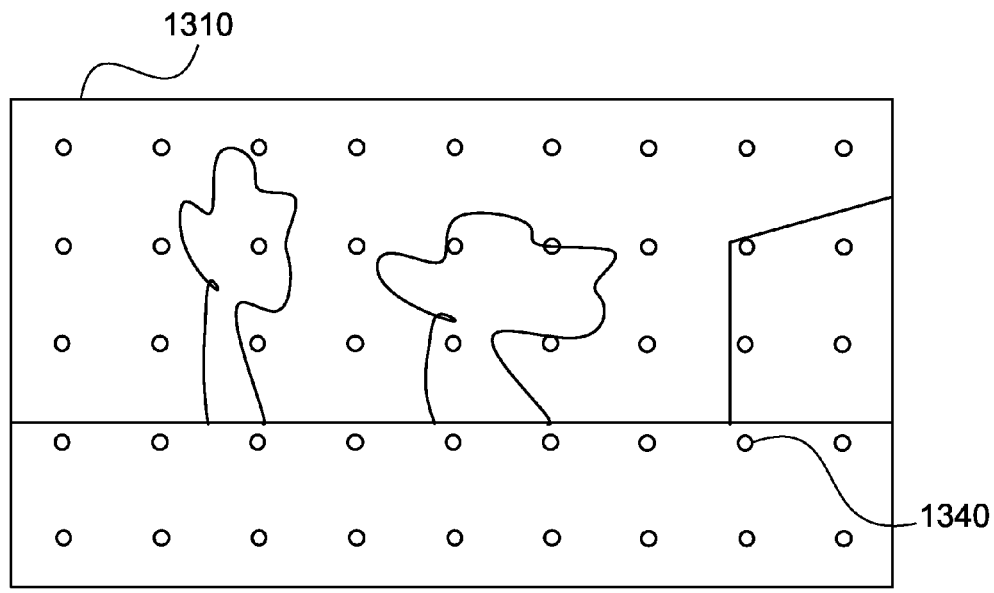
FIG. 13A shows the location of grid based seed points in an example of an input image for a scene.
Figure 13B:
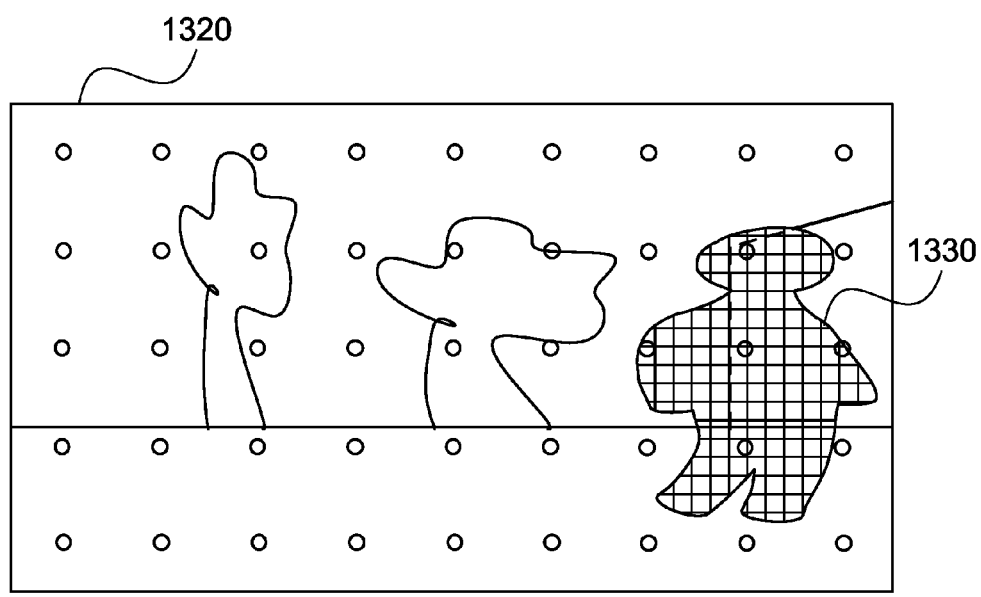
FIG. 13B shows the same scene as FIG. 13A at a later time containing a foreground object shown in cross hatching.

FIG. 13A shows an example of an image 1310 in a video sequence of a scene. Grid points (superpixel seeds) are shown by the empty circles (for example, 1340). FIG. 13B shows an example of an image 1320 in the same image sequence as FIG. 13A but at a later time. A foreground object 1330 is shown in the image 1320.

Figure 13C:
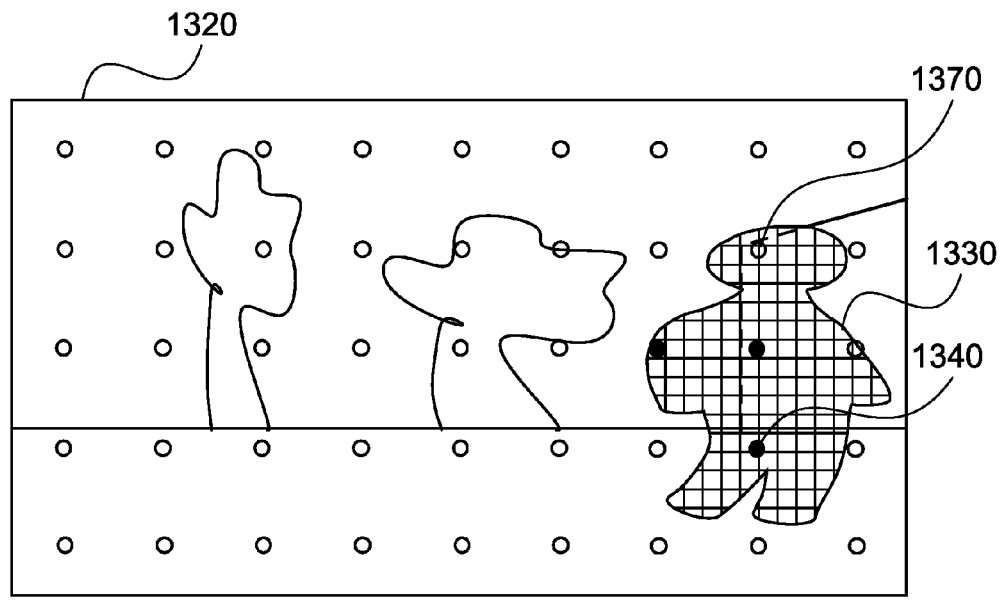
FIG. 13C shows the grid points initially detected as foreground.

FIG. 13C shows the three (3) grid points initially detected as foreground (for example, grid point 1340) in the example image 1320 by the method 800 executed by the processor 105. The three (3) grid points initially detected as foreground (for example, grid point 1340) are shown as filled in black circles. Part of the foreground object 1330 is the same colour as the background, so some grid points (for example, grid point 1370) in the foreground object 1330 were not initially detected as foreground, but rather are initially detected as background.

Figure 13D:
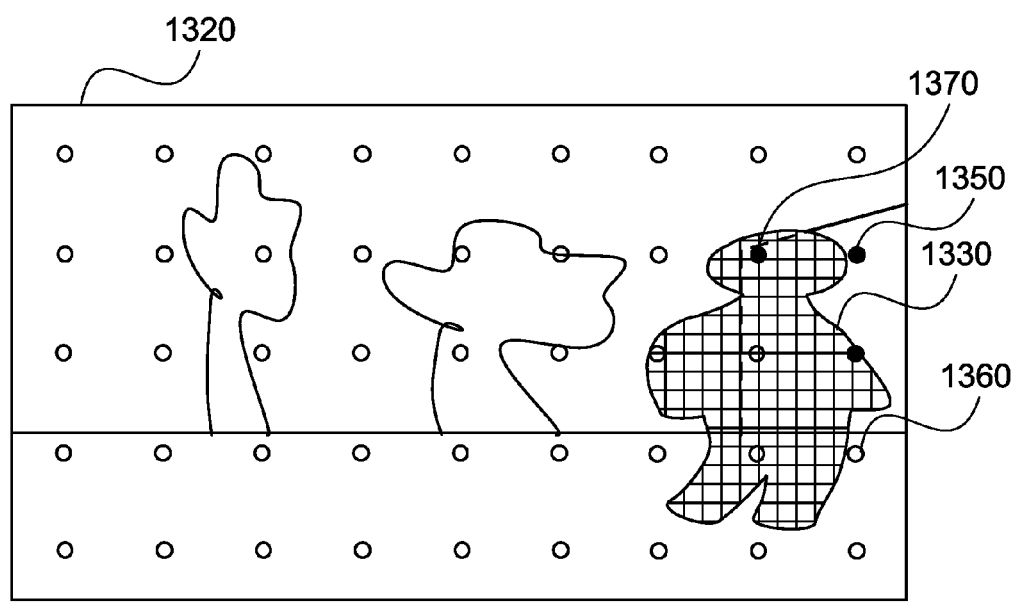
FIG. 13D shows the grid points in the spatially expanded area.

FIG. 13D shows the three (3) grid points in the spatially expanded area (being, grid points 1330, 1350 and 1370) in the example image 1320 as identified by the method 900 executed by the processor 105. The three (3) grid points 1330, 1350 and 1370 in the spatially expanded area are shown as filled in black circles.

The grid points corresponding to the foreground object 1330 that were not initially detected as foreground are in the spatially expanded area (for example, grid point 1370). There is also a grid point that should be classified as background (grid point 1350) also in the spatially expanded area. The point 1350 for example may have been part of the building 440 (FIG. 4A) that has a colour similar to that of the person 1330. As such the point 1350 is correctly classified as background and, even though it falls within the spatially expanded area, it remains background.

Other grid points close to the detected foreground (for example, grid point 1360) are not included in the spatially expanded area as they are not visually connected to the initially detected foreground grid points (for example, grid point 1340). The point 1360 for example may be green grass and this quite visually distinct from the person 1330.

Figure 13E:
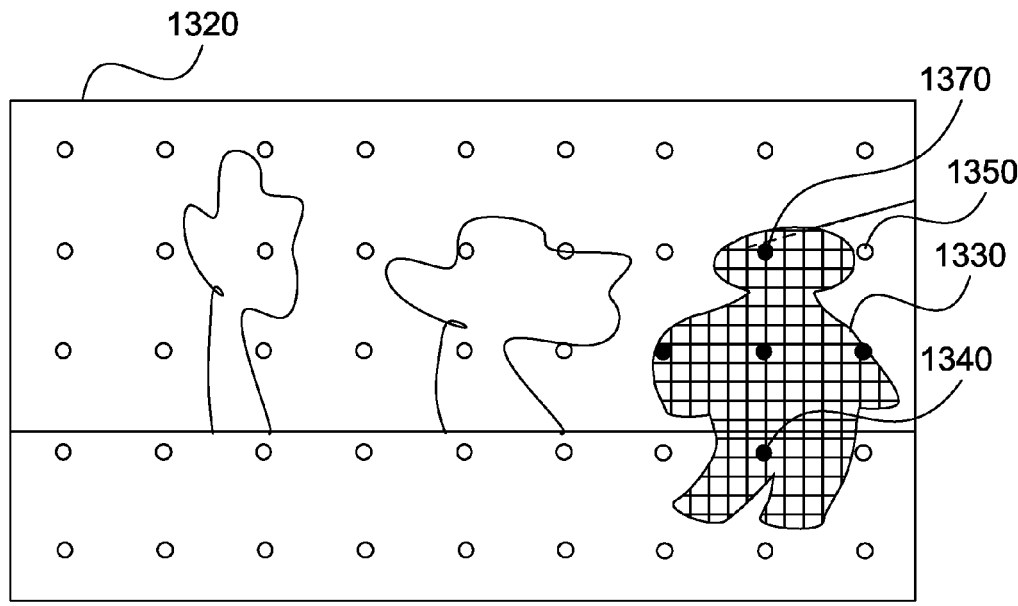
FIG. 13E shows the grid points finally detected as foreground.

FIG. 13E shows the grid points detected as foreground (for example, grid point 1340 and grid point 1370) in the example image 1320 after the grid points in the spatially expanded area have been processed by method 1000 as executed by the processor 105.

The grid points (for example, grid point 1370) in the foreground object 1330 that were initially classified as background by method 800 have now been classified as foreground by the more sensitive classifier in the method 1000. The grid point 1350 in the spatially expanded area that is not inside the foreground object 1330 has been classified as background by the more sensitive classifier in the method 1000. This means that the grid point 1350 passed the stricter classification test and as such was not re-classified as foreground.

INDUSTRIAL APPLICABILITY

The arrangements described are applicable to the computer and data processing industries and particularly for the video object detection applications, particularly those that seek to distinguish background and foreground. This is particularly useful in video surveillance systems and more specifically for removal of noise from a scene that may otherwise corrupt the detection of foreground. This can include trees moving in the wind, the rippling of water, or shadows cast by buildings or other objects such as motor vehicles. For example where the shadow of a motor vehicle is detected as foreground, such may frustrate identification of the moving object as a motor vehicle. By correctly classifying the shadow as background, provides for the object of the motor vehicle to more accurately represent a vehicle and that attract such an identification. As such, surveillance cameras configured according to the present disclosure can operate to better discriminate foreground from background.

The foregoing describes only some embodiments of the present invention, and modifications and/or changes can be made thereto without departing from the scope and spirit of the invention, the embodiments being illustrative and not restrictive.

The invention claimed is:

1. A method of classifying visual elements in a region of a video as either foreground or background, the method comprising:
   classifying each visual element in the region as either foreground or background using a first classifying method;
   expanding spatially at least one of the visual elements classified as foreground to form a spatially expanded area; and
   classifying the visual elements in the spatially expanded area as either foreground or background using a second classifying method that is more sensitive for detecting foreground than the first classifying method.

2. The method according to claim 1, wherein the expanding spatially step uses a structuring element.

3. The method according to claim 1, wherein the expanding spatially step uses visual similarity between visual elements.

4. The method according to claim 3, wherein the expanding spatially step uses a structuring element and visually connected visual elements defined by the structuring element are added to the spatially expanded area.

5. The method according to claim 1, further comprising a connected components step that forms one or more blobs of like classified visual elements, and the expanding spatially step uses a bounding box of the corresponding blob.

6. The method according to claim 5, wherein the expanding spatially step uses a structuring element and visually connected visual elements identified by applying the structuring element to the visual elements in a blob are added to the spatially expanded area if they are also within the bounding box of the blob.

7. The method according to claim 5, wherein the expanding spatially step uses a structuring element and visually connected visual elements identified by applying the structuring element to the visual elements in the blob are added to the spatially expanded area where those identified visual elements are also within a number of visual elements from the edge of the blob bounding box.

8. The method according to claim 1, wherein the expanding spatially steps expands the visual elements asymmetrically.

9. The method according to claim 8, wherein the spatial expansion is configured to spatially expand visual elements by less in a downward direction in comparison to other directions.

10. The method according to claim 1, wherein the second classifier is configured to be less likely to match any given input visual element to a background model than the first classifier.

11. The method according to claim 10, further comprising establishing the first and second classifiers such that an N-dimensional volume of visual attribute values in an input visual element that the first classifier will match to the background model is larger than the N-dimensional volume of visual attribute values in an input visual element that the second classifier will match to the background model.

12. The method according to claim 1, wherein the first classifier and second classifier are configured to assume a Gaussian distribution.

13. The method according to claim 12, wherein the second classifier is configured to assume a narrower luminance Gaussian distribution than the first classifier.

14. An apparatus comprising a processor and a memory, the memory having a program recorded thereon and executable by the processor, the program causing a computer to execute a method of classifying visual elements in a region of a video as either foreground or background, the method comprising:
   classifying each visual element in the region as either foreground or background using a first classifying method;
   expanding spatially at least one of the visual elements classified as foreground to form a spatially expanded area; and
   classifying the visual elements in the spatially expanded area as either foreground or background using a second classifying method that is more sensitive for detecting foreground than the first classifying method.

15. The apparatus according to claim 14, wherein expanding spatially uses a structuring element visual similarity between visual elements.

16. The apparatus according to claim 15, wherein the code for expanding spatially uses a structuring element and visually connected visual elements defined by the structuring element are added to the spatially expanded area.

17. A non-transitory computer readable storage medium having a program recorded thereon, the program being executable by a processor to classify visual elements in a region of a video as either foreground or background, the program comprising:
   code for classifying each visual element in the region as either foreground or background using a first classifying method;
   code for expanding spatially at least one of the visual elements classified as foreground to form a spatially expanded area; and
   code for classifying the visual elements in the spatially expanded area as either foreground or background using a second classifying method that is more sensitive for detecting foreground than the first classifying method.

18. The non-transitory computer readable storage medium of claim 17, wherein the code for expanding spatially uses a structuring elementvisual similarity between visual elements.

19. The non-transitory computer readable storage medium of claim 17, wherein the code for expanding spatially step uses a structuring element and visually connected visual elements defined by the structuring element are added to the spatially expanded area.

20. The non-transitory computer readable storage medium of claim 17, further comprising code for forming connected components that forms one or more blobs of like classified visual elements, and the expanding spatially step uses a bounding box of the corresponding blob.

21. A method of classifying each of visual elements in an image as either foreground or background, the method comprising:
   classifying each of the visual elements in the image as either foreground or background using a first classifying method;

setting a visual element as a visual element of interest, the visual element being one of the visual elements classified as foreground; and classifying, using a second classifying method that is more sensitive to foreground detection than the first classifying method, each of visual elements which are in a target area including the visual element of interest and a visual element adjacent to the visual element of interest, as either foreground or background to thereby classify the visual element of interest as either foreground or background.

22. The method according to claim 21, wherein the visual element of interest is classified as foreground in a case where a visual element satisfying both a first requirement and a second requirement exists, the first requirement being that the visual element is classified as foreground through the second classifying method, and a second requirement being that the visual element is, as an area which is similar in color to the visual element of interest, connected to the visual element of interest.

23. The method according to claim 22, further comprising:

searching for a visual element which is similar in color to the visual element of interest, the searching being performed in a predetermined direction from the visual element of interest; and determining, based on a result of the searching, the area which is similar in color to the visual element of interest.

24. The method according to claim 21, wherein the visual elements classified using the second classifying method includes a smaller number of visual elements being matched to a background model than the visual elements classified using the first classifying method.

25. The method according to claim 21, wherein the visual elements are super pixels.

26. An apparatus comprising at least one processor and a memory, the memory having a program recorded thereon and executable by the processor, the program causing the at least one processor to execute a method of classifying each of visual elements in an image as either foreground or background, the method comprising:

classifying each of the visual elements in the image as either foreground or background using a first classifying method;

setting a visual element as a visual element of interest, the visual element being one of the visual elements classified as foreground; and classifying, using a second classifying method that is more sensitive to foreground detection than the first classifying method, each of visual elements which are in a target area including the visual element of interest and a visual element adjacent to the visual element of interest, as either foreground or background to thereby classify the visual element of interest as either foreground or background.

27. A non-transitory computer readable storage medium having a program recorded thereon executable by a processor to execute a method for classifying each of visual elements in an image as either foreground or background, the method comprising:

classifying each of the visual elements in the image as either foreground or background using a first classifying method;

setting a visual element as a visual element of interest, the visual element being one of the visual elements classified as foreground; and classifying, using a second classifying method that is more sensitive to foreground detection than the first classifying method, each of visual elements which are in a target area including the visual element of interest and a visual element adjacent to the visual element of interest, as either foreground or background to thereby classify the visual element of interest as either foreground or background.

* * * * *